(12) United States Patent
Yamagajo et al.

(10) Patent No.: US 8,022,878 B2
(45) Date of Patent: Sep. 20, 2011

(54) RFID TAG AND MANUFACTURING METHOD THEREOF

(75) Inventors: Takashi Yamagajo, Kawasaki (JP); Toru Maniwa, Kawasaki (JP); Manabu Kai, Kawasaki (JP); Yasuyuki Oishi, Kawasaki (JP); Yoshiyasu Sugimura, Inagi (JP); Shunji Baba, Kawasaki (JP)

(73) Assignees: Fujitsu Limited, Kawasaki (JP); Fujitsu Frontech Limited, Inagi (JP)

( * ) Notice: Subject to any disclaimer, the term of this patent is extended or adjusted under 35 U.S.C. 154(b) by 635 days.

(21) Appl. No.: 11/882,232

(22) Filed: Jul. 31, 2007

(65) Prior Publication Data
US 2008/0036673 A1    Feb. 14, 2008

(30) Foreign Application Priority Data

Aug. 9, 2006  (JP) .................................. 2006-216727
Jan. 10, 2007  (JP) .................................. 2007-001989

(51) Int. Cl.
*H01Q 1/38* (2006.01)
*H01Q 9/16* (2006.01)
(52) U.S. Cl. ................. 343/700 MS; 343/793
(58) Field of Classification Search ........................ None
See application file for complete search history.

(56) References Cited

U.S. PATENT DOCUMENTS

| | | | |
|---|---|---|---|
| 4,506,148 A | 3/1985 | Berthold et al. | |
| 5,248,947 A * | 9/1993 | Shiga | 331/44 |
| 6,215,401 B1 | 4/2001 | Brady et al. | |
| 6,259,408 B1 * | 7/2001 | Brady et al. | 343/700 MS |
| 6,559,802 B2 * | 5/2003 | Goto et al. | 343/702 |
| 6,873,291 B2 * | 3/2005 | Aoyama et al. | 343/700 MS |
| 7,196,663 B2 * | 3/2007 | Bolzer et al. | 343/700 MS |
| 7,511,621 B1 * | 3/2009 | Duan et al. | 340/572.7 |
| 2005/0012675 A1 | 1/2005 | Sakiyama et al. | |
| 2005/0057400 A1 | 3/2005 | Yuanzhu | |
| 2006/0032926 A1 | 2/2006 | Baba et al. | |
| 2007/0229276 A1 * | 10/2007 | Yamagajo et al. | 340/572.7 |
| 2009/0140947 A1 * | 6/2009 | Sasagawa et al. | 343/845 |

FOREIGN PATENT DOCUMENTS

| | | |
|---|---|---|
| EP | 0079047 A2 | 11/1982 |
| JP | 6276007 A | 9/1994 |
| JP | 8096105 A | 4/1996 |
| JP | 2000223933 A | 8/2000 |
| JP | 2002-298106 | 10/2002 |
| JP | 2004096210 A | 3/2004 |

(Continued)

OTHER PUBLICATIONS

Extended European Search Report; Application No. 07113777.2; Reference No. P108998EP00/ECR; 7 pages.

(Continued)

*Primary Examiner* — Trinh V Dinh
(74) *Attorney, Agent, or Firm* — Murphy & King, P.C.

(57) ABSTRACT

An RFID tag having a tag antenna and an LSI chip, comprising: a power-supply pattern on which the LSI chip is mounted; a patch antenna that functions as the tag antenna; and a high-frequency connection section that makes a high-frequency connection between the power-supply pattern and the patch antenna. The high-frequency connection section is formed, for example, by forming a slot in the patch antenna, layering one end of a small dipole antenna that functions as the power-supply pattern over the slot so that it crosses over the slot, and supplying power from the small dipole antenna to the patch antenna.

2 Claims, 30 Drawing Sheets

FOREIGN PATENT DOCUMENTS

| | | | |
|---|---|---|---|
| JP | 2004295297 | A | 10/2004 |
| JP | 2005303528 | A | 10/2005 |
| JP | 2006033298 | A | 2/2006 |
| TW | 200622914 | | 7/2006 |
| WO | WO 97/24628 | A1 | 7/1997 |
| WO | WO 00/43952 | A1 | 7/2000 |
| WO | WO 02/39379 | A1 | 5/2002 |
| WO | WO 2004/015625 | A1 | 2/2004 |
| WO | WO 2005/031983 | A2 | 4/2005 |
| WO | WO 2005/031983 | A3 | 4/2005 |
| WO | WO 2006/049068 | A1 | 5/2006 |
| WO | 2006064540 | A1 | 6/2006 |

OTHER PUBLICATIONS

European Communication dated Aug. 5, 2010 for application No. 07113777.2-1248.

Official Letter dated Oct. 29, 2010 from Intellectual Property Bureau Ministry of Economic Affairs for reference No. 09920763650.

3rd Notification of Office Action dated Nov. 4, 2010 received in corresponding Patent Application No. 200710140258.1.

Notification of reason for refusal from Japan Patent Office in corresponding application No. 2007-001989, mailed Apr. 5, 2011.

* cited by examiner

FIG. 2
(A)
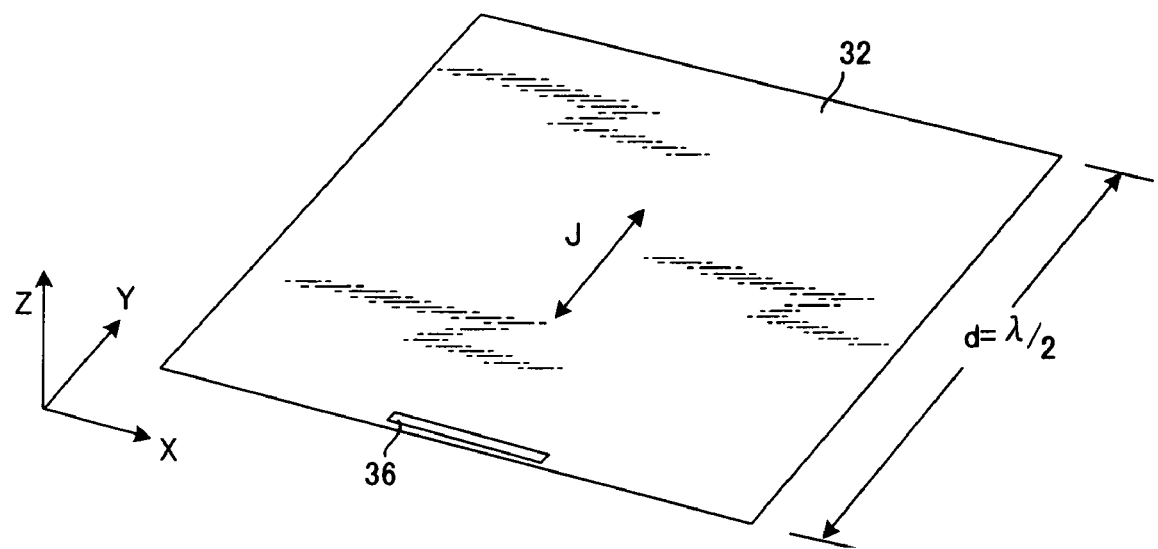
(B)

(A)

(B)

| SIZE [mm] | | BOARD CHARACTERISTICS | |
|---|---|---|---|
| L | 70 | SPECIFIC DIELECTRIC CONSTANT $\varepsilon_r$ | 4.4 |
| W | 42 | DIELECTRIC LOSS $\tan\delta$ | 0.01 |
| S0 | 20 | THICKNESS | 1.2 mm |
| S1 | 30 | | |
| S2 | 10 | | |
| S3 | 5 | | |
| S4 | 4 | | |
| S5 | 23 | | |
| S6 | 23.5 | | |

FIG. 5

| FREQUENCY [MHz] | WAVE-LENGTH [m] | LSI | | | TAG ANTENNA | | | | | COMMUNICATION DISTANCE [m] LINEARLY POLARIZED WAVE | COMMUNICATION DISTANCE [m] CIRCULARLY POLARIZED WAVE |
|---|---|---|---|---|---|---|---|---|---|---|---|
| | | Bcp[S] | Rc[Ω] | Xc[Ω] | Ra[Ω] | Xa[Ω] | q (MATCHING COEFFICIENT) | S11 [dB] | GAIN [dBi] | GAIN [TRUE VALUE] | |
| 850.0 | 0.353 | 3.204E-03 | 151.347 | -193.992 | 4.496736 | 113.3513 | 0.088 | -0.402 | -17.955 | 0.016 | 0.211 | 0.149 |
| 860.0 | 0.349 | 3.242E-03 | 149.153 | -193.428 | 4.972368 | 118.4245 | 0.101 | -0.462 | -17.0186 | 0.020 | 0.248 | 0.175 |
| 870.0 | 0.345 | 3.280E-03 | 146.996 | -192.849 | 5.551136 | 124.0333 | 0.117 | -0.538 | -16.0187 | 0.025 | 0.295 | 0.209 |
| 880.0 | 0.341 | 3.318E-03 | 144.878 | -192.254 | 6.276882 | 130.3037 | 0.136 | -0.636 | -14.9423 | 0.032 | 0.357 | 0.253 |
| 890.0 | 0.337 | 3.355E-03 | 142.796 | -191.645 | 7.230157 | 137.4186 | 0.162 | -0.769 | -13.7741 | 0.042 | 0.441 | 0.312 |
| 900.0 | 0.333 | 3.393E-03 | 140.751 | -191.022 | 8.586375 | 145.6278 | 0.198 | -0.961 | -12.4841 | 0.056 | 0.560 | 0.396 |
| 910.0 | 0.329 | 3.431E-03 | 138.741 | -190.387 | 10.49479 | 155.3095 | 0.248 | -1.237 | -11.0163 | 0.079 | 0.733 | 0.518 |
| 920.0 | 0.326 | 3.468E-03 | 136.767 | -189.741 | 13.75255 | 167.5142 | 0.325 | -1.707 | -9.44414 | 0.114 | 0.994 | 0.703 |
| 930.0 | 0.322 | 3.506E-03 | 134.828 | -189.084 | 20.73729 | 183.716 | 0.462 | -2.689 | -7.74671 | 0.168 | 1.425 | 1.008 |
| 940.0 | 0.319 | 3.544E-03 | 132.923 | -188.416 | 41.09897 | 205.1779 | 0.715 | -5.451 | -6.0617 | 0.248 | 2.131 | 1.507 |
| 945.0 | 0.317 | 3.563E-03 | 131.983 | -188.079 | 66.24338 | 211.6336 | 0.878 | -9.123 | -5.34044 | 0.292 | 2.552 | 1.804 |
| 947.5 | 0.316 | 3.572E-03 | 131.516 | -187.909 | 83.84422 | 206.8559 | 0.944 | -12.495 | -5.04423 | 0.313 | 2.730 | 1.931 |
| 950.0 | 0.316 | 3.581E-03 | 131.051 | -187.739 | 99.67315 | 191.6156 | 0.981 | -17.265 | -4.80646 | 0.331 | 2.854 | 2.018 |
| 952.5 | 0.315 | 3.591E-03 | 130.588 | -187.569 | 104.5748 | 167.9945 | 0.981 | -17.205 | -4.63796 | 0.344 | 2.902 | 2.052 |
| 955.0 | 0.314 | 3.600E-03 | 130.128 | -187.398 | 94.89881 | 146.8918 | 0.945 | -12.587 | -4.54732 | 0.351 | 2.870 | 2.030 |
| 957.5 | 0.313 | 3.610E-03 | 129.669 | -187.226 | 77.99026 | 136.4377 | 0.885 | -9.398 | -4.53947 | 0.352 | 2.773 | 1.961 |
| 960.0 | 0.312 | 3.619E-03 | 129.212 | -187.054 | 61.98598 | 135.4147 | 0.817 | -7.371 | -4.61491 | 0.346 | 2.634 | 1.863 |
| 962.5 | 0.311 | 3.629E-03 | 128.758 | -186.881 | 49.78117 | 139.5027 | 0.751 | -6.045 | -4.76955 | 0.333 | 2.476 | 1.750 |
| 965.0 | 0.311 | 3.638E-03 | 128.305 | -186.708 | 41.18268 | 145.6855 | 0.695 | -5.158 | -4.9955 | 0.317 | 2.314 | 1.636 |
| 970.0 | 0.309 | 3.657E-03 | 127.406 | -186.360 | 31.2184 | 159.3465 | 0.614 | -4.139 | -5.61825 | 0.274 | 2.015 | 1.424 |
| 980.0 | 0.306 | 3.695E-03 | 125.632 | -185.659 | 24.58668 | 184.9433 | 0.548 | -3.444 | -7.24199 | 0.189 | 1.561 | 1.104 |

FIG. 11
(A)
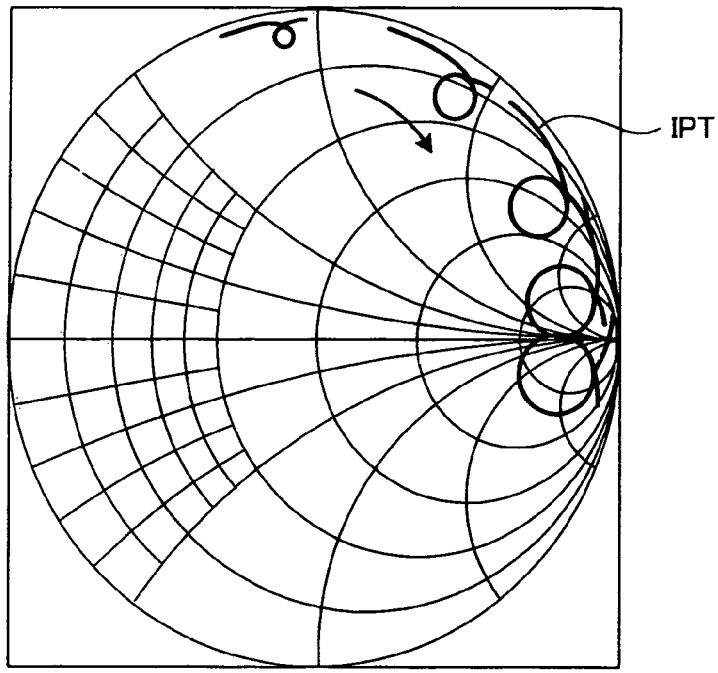
(B)
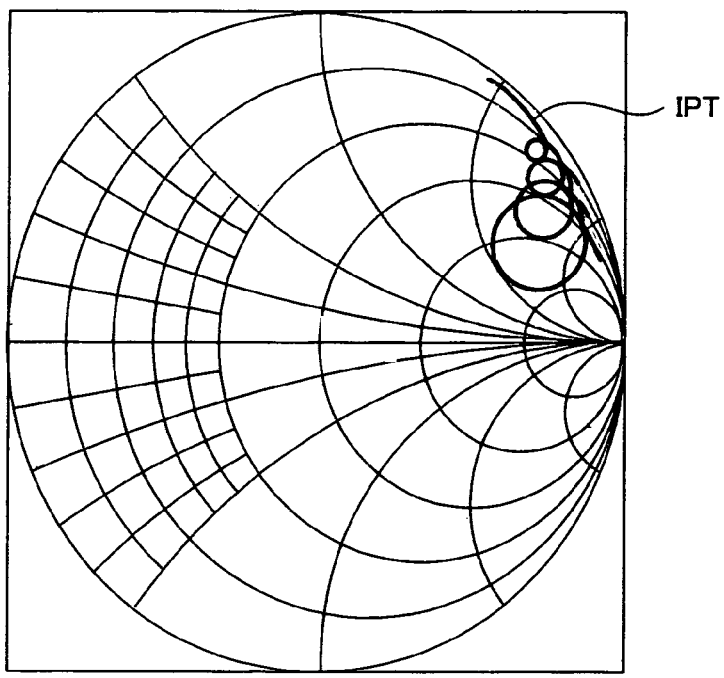

(A)

(B)

| SIZE [mm] | | BOARD CHARACTERISTICS | |
|---|---|---|---|
| L | 78 | SPECIFIC DIELECTRIC CONSTANT $\varepsilon_r$ | 3.6 |
| W | 40 | DIELECTRIC LOSS $\tan \delta$ | 0.001 |
| S0 | 2.5 | THICKNESS | 1.2mm |
| S1 | 10 | | |
| S2 | 30 | | |
| S3 | 6 | | |
| S4 | 1 | | |
| S5 | 23 | | |
| S6 | 23.5 | | |
| S7 | 6 | | |
| W2 | 3.5 | | |

FIG. 16

| FRE-QUENCY [MHz] | WAVE-LENGTH [m] | LSI | | | TAG ANTENNA | | | | | COMMUNICA-TION DISTANCE [m] LINEARLY POLARIZED WAVE | COMMUNICA-TION DISTANCE [m] CIRCULARLY POLARIZED WAVE |
|---|---|---|---|---|---|---|---|---|---|---|---|
| | | Bcp[S] | Rc[Ω] | Xc[Ω] | Ra[Ω] | Xa[Ω] | q (MATCHING COEFFI-CIENT) | S11 [dB] | GAIN [dBi] | GAIN [TRUE VALUE] | | |
| 850.0 | 0.353 | 3.738E-03 | 14.269 | -266.724 | 3.424638 | 186.16 | 0.029 | -0.127 | -26.4597 | 0.002 | 0.045 | 0.032 |
| 860.0 | 0.349 | 3.782E-03 | 13.940 | -263.640 | 3.527907 | 190.293 | 0.035 | -0.153 | -25.5923 | 0.003 | 0.054 | 0.038 |
| 870.0 | 0.345 | 3.826E-03 | 13.622 | -260.626 | 3.636803 | 194.549 | 0.042 | -0.189 | -24.6527 | 0.003 | 0.066 | 0.047 |
| 880.0 | 0.341 | 3.870E-03 | 13.315 | -257.680 | 3.752113 | 198.9364 | 0.053 | -0.238 | -23.6196 | 0.004 | 0.082 | 0.058 |
| 890.0 | 0.337 | 3.914E-03 | 13.019 | -254.800 | 3.875011 | 203.4654 | 0.069 | -0.311 | -22.4623 | 0.006 | 0.106 | 0.075 |
| 900.0 | 0.333 | 3.958E-03 | 12.732 | -251.984 | 4.007478 | 208.1493 | 0.093 | -0.422 | -21.1347 | 0.008 | 0.141 | 0.100 |
| 910.0 | 0.329 | 4.002E-03 | 12.454 | -249.228 | 4.15339 | 213.0067 | 0.130 | -0.606 | -19.5641 | 0.011 | 0.199 | 0.140 |
| 920.0 | 0.326 | 4.046E-03 | 12.185 | -246.533 | 4.321957 | 218.0686 | 0.195 | -0.940 | -17.6257 | 0.017 | 0.300 | 0.212 |
| 930.0 | 0.322 | 4.090E-03 | 11.925 | -243.895 | 4.54153 | 223.3987 | 0.313 | -1.633 | -15.0846 | 0.031 | 0.505 | 0.357 |
| 940.0 | 0.319 | 4.134E-03 | 11.674 | -241.312 | 4.943055 | 229.1731 | 0.545 | -3.420 | -11.4395 | 0.072 | 1.002 | 0.708 |
| 945.0 | 0.317 | 4.156E-03 | 11.551 | -240.041 | 5.428445 | 232.3818 | 0.723 | -5.573 | -8.90141 | 0.129 | 1.537 | 1.087 |
| 947.5 | 0.316 | 4.167E-03 | 11.490 | -239.411 | 5.917358 | 234.1099 | 0.821 | -7.480 | -7.39961 | 0.182 | 1.942 | 1.373 |
| 950.0 | 0.316 | 4.178E-03 | 11.430 | -238.784 | 6.813597 | 235.8578 | 0.913 | -10.580 | -5.79584 | 0.263 | 2.456 | 1.737 |
| 952.5 | 0.315 | 4.189E-03 | 11.370 | -238.160 | 8.456748 | 237.1674 | 0.976 | -16.192 | -4.31863 | 0.370 | 3.003 | 2.123 |
| 955.0 | 0.314 | 4.200E-03 | 11.311 | -237.539 | 10.25965 | 236.6738 | 0.996 | -24.005 | -3.50516 | 0.446 | 3.323 | 2.349 |
| 957.5 | 0.313 | 4.211E-03 | 11.252 | -236.922 | 9.496913 | 235.2913 | 0.987 | -18.779 | -3.89037 | 0.408 | 3.155 | 2.231 |
| 960.0 | 0.312 | 4.222E-03 | 11.193 | -236.308 | 7.608015 | 235.9827 | 0.963 | -14.359 | -5.27341 | 0.297 | 2.652 | 1.875 |
| 962.5 | 0.311 | 4.233E-03 | 11.135 | -235.696 | 6.480009 | 237.6997 | 0.918 | -10.877 | -7.02709 | 0.198 | 2.110 | 1.492 |
| 965.0 | 0.311 | 4.244E-03 | 11.078 | -235.089 | 5.922078 | 239.5461 | 0.850 | -8.228 | -8.76691 | 0.133 | 1.657 | 1.172 |
| 970.0 | 0.309 | 4.266E-03 | 10.964 | -233.882 | 5.496887 | 243.077 | 0.678 | -4.923 | -11.8105 | 0.066 | 1.037 | 0.734 |
| 980.0 | 0.306 | 4.310E-03 | 10.742 | -231.506 | 5.39458 | 249.7166 | 0.392 | -2.158 | -16.3729 | 0.023 | 0.461 | 0.326 |

(A)

(B)

| SIZE [mm] | | BOARD CHARACTERISTICS | |
|---|---|---|---|
| L | 70.5 | SPECIFIC DIELECTRIC CONSTANT $\varepsilon_r$ | 5 |
| W | 15 | DIELECTRIC LOSS $\tan \delta$ | 0.01 |
| S0 | 10 | THICKNESS | 1.2mm |
| S1 | 4 | | |
| S2 | 20 | | |
| S3 | 30 | | |
| S4 | 2.5 | | |
| W2 | 4.0 | | |

FIG. 28
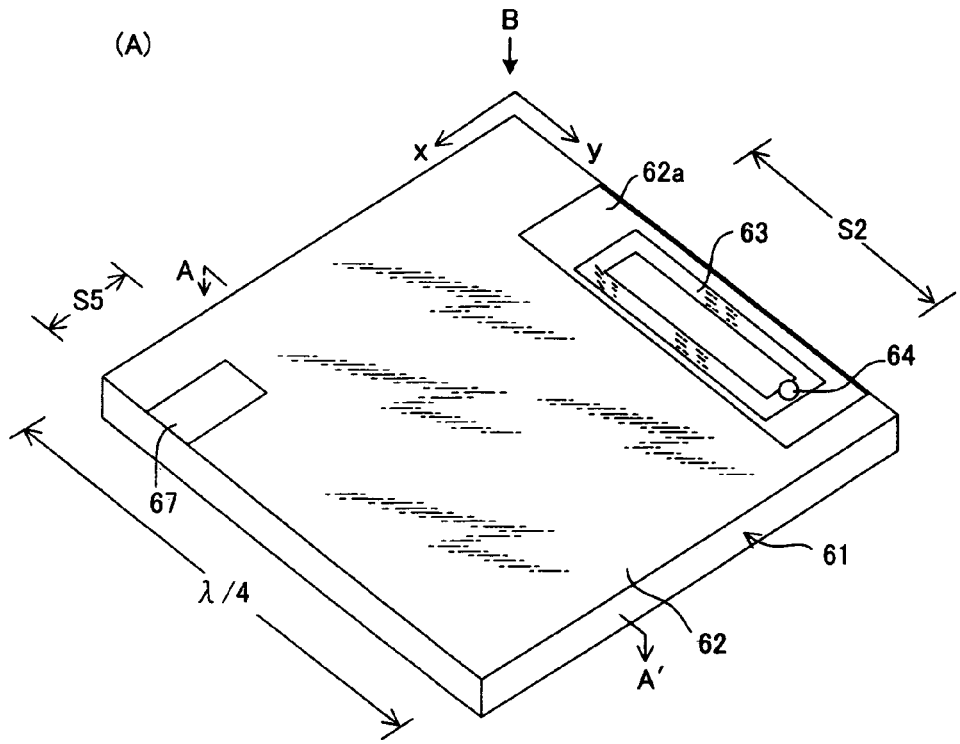
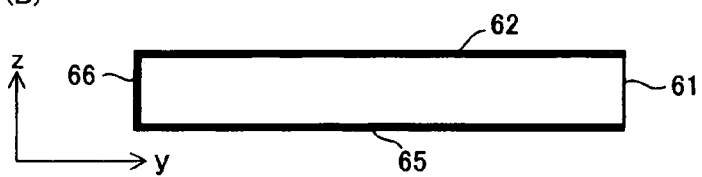
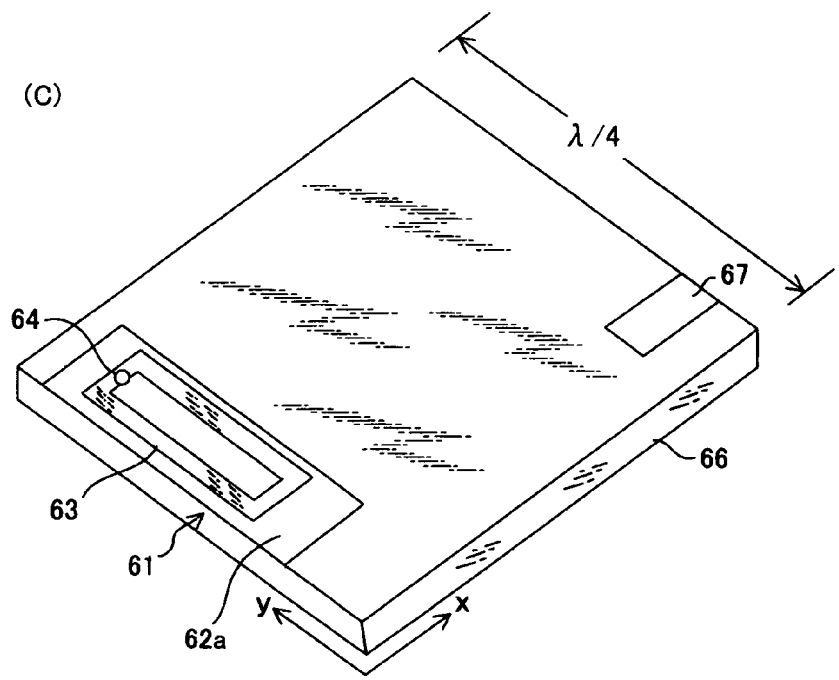

FIG. 32
(A)
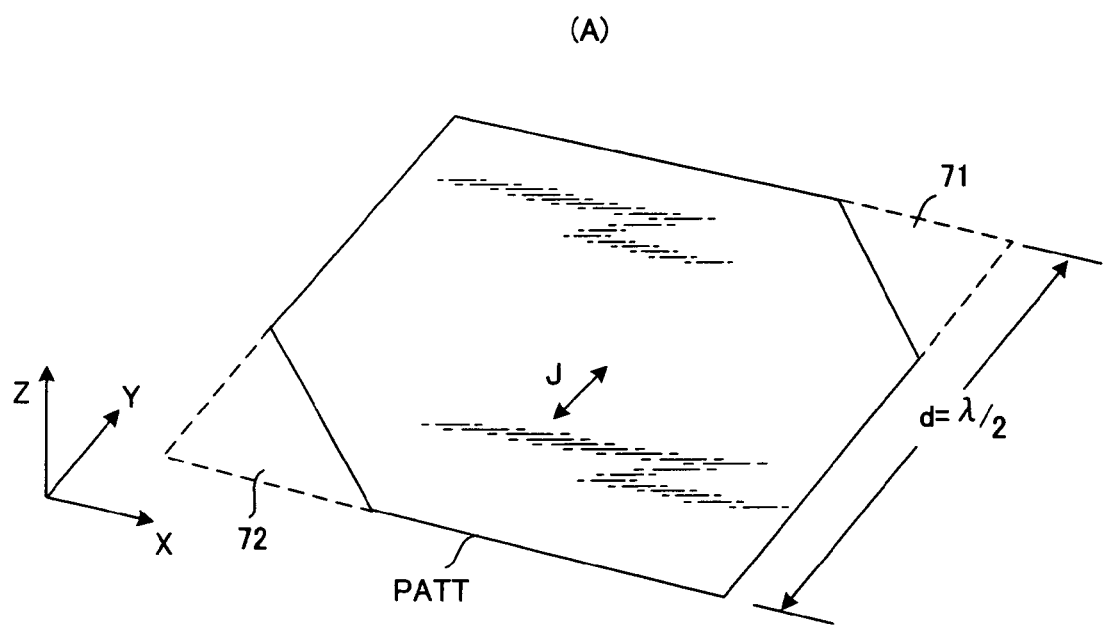
(B)
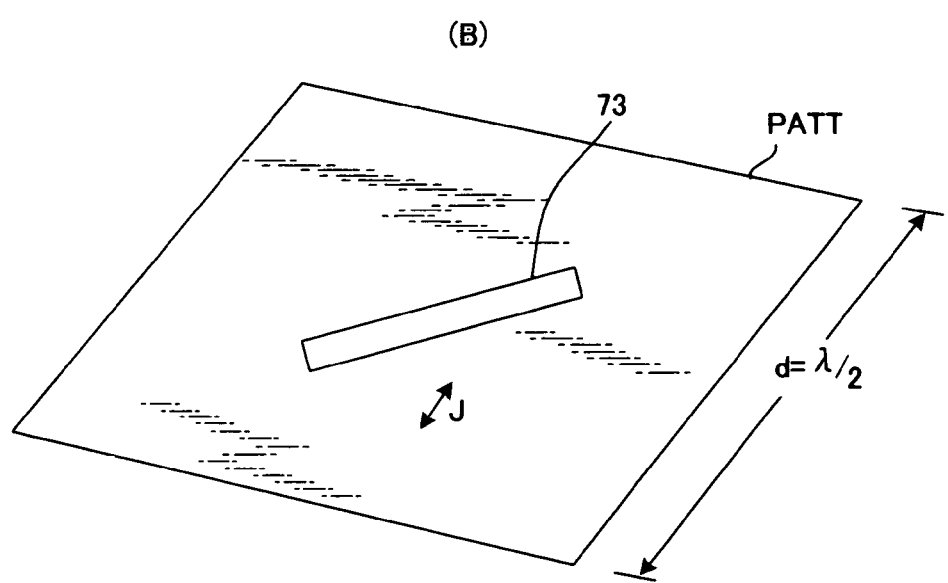

RFID TAG AND MANUFACTURING METHOD THEREOF

BACKGROUND OF THE INVENTION

The present invention relates to an RFID tag and manufacturing method thereof, and more particularly an RFID tag that comprises a patch antenna (flat antenna) as the tag antenna, and which is capable of demonstrating the required characteristics even when applied to an object such as a electrically conductive body, electrically non-conductive body or a body including liquid, and to the manufacturing method thereof.

Conventionally, in the distribution industry, transport industry and the like, a method of printing or sticking barcodes on a product itself or on the product packaging, and then reading that barcode with a barcode reader has been widely used as a method for managing individual product information. However, in that barcode processing method, when reading the barcode, the barcode reader must come in contact with the barcode, which makes the work of reading troublesome. Moreover, in the conventional barcode processing method, there is a problem in that it is not possible to add new information or update the information of the barcode itself.

Therefore, recently, a method of attaching an RFID (Radio Frequency Identification) tag to products in the place of a barcode, and reading that product information without contact using radio waves (electromagnetic coupling) is needed and is in the progress of being put into practical use. An RFID tag is a tag that has an IC card function to which a radio communication function for information has been added, and has a non-volatile memory that is capable of storing information, but does not have a battery (power source). Therefore, when reading information from the RFID tag memory without contact, a tag reader is constructed so that it supplies power to the RFID tag using electromagnetic waves, and reads information from the tag memory. With this kind of RFID tag, it is possible to greatly improve workability, and by using a technology such as a verification function or encoding between the reader and RFID tag, it is possible to ensure good security.

FIG. 38 is a drawing explaining an RFID tag, where a reader 1 transmits a radio signal (electromagnetic wave) of modulated data from an antenna 2 to an RFID tag 3. The antenna 3a of the RFID tag 3 inputs the received signal to a rectifier circuit 3b and a modulation and demodulation circuit 3c. The rectifier circuit 3b converts the radio signal to DC voltage, and supplies this DC voltage to the modulation and demodulation circuit 3c and a logic circuit 3d, and that voltage functions as a power supply. The modulation and demodulation circuit 3c demodulates control data that was sent from the reader 1, and inputs the result to the logic circuit 3d. The logic circuit 3d performs logic processing according to the control data (command), for example, reads information that is stored in an internal memory and inputs that information to the modulation and demodulation circuit 3c. The modulation and demodulation circuit 3c uses the information that was input from the logic circuit 3d to modulate a carrier signal, and transmits that signal as a radio signal from the antenna 3a to the reader 1.

Various types of RFID tags have been proposed. One of those is an RFID tag that is constructed by mounting an antenna pattern for radio communication and an IC chip (LSI) on a dielectric base sheet made of plastic, paper or the like. When this kind of RFID tag is attached to an electrically non-conductive object, the desired performance, such as communication distance and the like, is obtained. However, when this kind of RFID tag is attached to metal such as steel, the metal obstructs the radio waves used for communication with the RFID tag, and problems occur such as a decrease in the communication distance.

FIG. 39 is a drawing explaining the occurrence of this kind of problem, where (A) of FIG. 39 shows the case in which an RFID tag having a half-wave length dipole antenna pattern is attached to an electrically non-conductive object (not shown in the figure), and the power (open-circuit V) necessary for the IC chip is generated in the dipole antenna DP by the radio waves emitted from the reader/writer antenna. Also, current I flows in the dipole antenna making it possible to transmit an electromagnetic signal to the reader/writer antenna.

However, when an RFID tag having a dipole antenna pattern is attached to a metal object, the tangential component of the electric field on the metal surface becomes '0' from the boundary condition, and the surrounding electric field becomes '0'. Therefore, it is not possible to supply the necessary power to the IC chip of the RFID tag. Also, it is not possible to transmit (scatter) an electromagnetic wave to the reader/writer antenna from the tag antenna. In other words, as shown in (B) of FIG. 39, in the case of an RFID tag having a dipole antenna pattern DP that is attached to a metal object MTL, when current I flows in the dipole antenna DP, an image IMG, in which current flows in the opposite direction, is generated in the metal object MTL according to the mapping principle. This image cancels out the electric field that is generated by the dipole antenna current I, and thus it is not possible to supply the necessary power to the IC chip of the RFID tag, and it becomes impossible to transmit an electromagnetic wave to the reader/writer antenna from the tag antenna. Due to the aforementioned problems, an RFID tag having a tag antenna capable of transmitting and receiving electromagnetic waves without degradation of the antenna gain even when attached to a metal surface is desired.

As shown in (C) of FIG. 39, reducing the image effect by increasing the distance D from the surface of the metal object MTL to the dipole pattern DP is feasible, however, there is a problem in that the thickness of the RFID tag increases. Also, an RFID system in the UHF band has the advantage of having a long communication distance compared with other frequency bands, however, the length of a dipole type tag antenna for the UHF band normally must be a half wave length (approximately 16 cm). This length can be ensured and made more compact by attaching and bending the tag antenna around a dielectric body, however, the bandwidth becomes narrow. Taking the aforementioned problem into consideration, desired is an RFID tag that is small and compact and that has an antenna being capable of large bandwidth without degradation of the antenna gain even when the RFID tag is made small and compact.

Also, in order to efficiently supply the receiving power of the tag antenna to the LSI chip, the impedances of the tag antenna and the LSI chip must be matched (impedance matching). In order to accomplish this, an impedance conversion circuit is necessary, however, that would increase the manufacturing cost of the RFID tag. Therefore, it is necessary to perform impedance matching of the tag LSI and tag antenna without using an impedance conversion circuit. In other words, desired is an RFID tag that has an antenna for which impedance matching with the LSI chip is possible without having to use an impedance conversion circuit.

Conventional RFID tags having a dipole antenna have a problem in that the communication distance becomes poor when the RFID tag is attached to metal as described above. Therefore, some tag antennas have been developed that are compatible with metal even in the UHF band (refer to JP2002-298106A), however all of these are large having a thickness of 4 mm or more and length of 10 cm or more.

Therefore, the inventors of the present invention proposed an RFID tag having a small antenna that is capable of transmitting and receiving electromagnetic waves even when attached to a metal surface (refer to JP2006-53833A). As shown in FIG. 40, this proposed RFID tag 10 comprises: a rectangular shaped dielectric member 11; a transmission/reception antenna pattern 12 that forms a loop antenna around the surface of the dielectric member 11; and an IC chip 15 that is electrically connected to the antenna pattern 12 by way of a chip-mounting pad 13. With the RFID tag having this kind of loop antenna construction, transmission and reception of electromagnetic waves is possible, it is possible to lengthen the communication length even though the RFID tag is thin and is attached to a metal, the gain is nearly constant over a wide band, and furthermore, impedance matching is possible even without an impedance conversion circuit. However, manufacturing an RFID tag having loop antenna construction requires complicated processes such as side surface plating, or processing for wrapping an insulating film around the dielectric member, so there are problems in that the manufacturing cost increases, or high precision is required for positioning the wrapping.

Therefore, recently, use of a patch antenna as an RFID antenna has been proposed. With an RFID tag having this patch antenna construction, there is no need for special work such as side-surface plating or wrapping as in the case of a RFID tag having loop antenna construction.

However, in order to use a patch antenna as an RFID tag antenna, impedance matching with the LSI chip of the RFID tag must be performed. Normally, supplying power to a patch antenna can be done such that power is supplied to the patch antenna from a position that is matched to a 50Ω power supply line, however the impedance of the LSI chip becomes a different value greater than 50Ω, so an impedance conversion circuit is necessary. Also, with a conventional patch antenna it is necessary to make holes in the patch antenna in order to supply power, so there is a problem in that processing cost increases.

An RFID tag patch antenna has been proposed that does not need an impedance conversion circuit, and does not require making holes in the antenna in order to supply power (refer to U.S. Pat. No. 6,215,401). This proposed method is a method that supplies power to the patch antenna in a state in which the tag LSI is DC-connected to this patch antenna, and performs impedance matching by regulating the width and length of the line used for connection, however, it has a problem in that it is easy for construction of the power supply unit to become complicated. Also, in the case of using a board having a low frequency and low dielectric constant, the percentage of space occupied by the impedance matching circuit pattern and quarter wavelength converter with respect to the overall antenna becomes large.

SUMMARY OF THE INVENTION

Taking the above into consideration, the object of the present invention is to provide an RFID tag and manufacturing method thereof for which the communication distance does not become poor even when attached to a metal and an object including liquid.

Another object of the present invention is to provide a RFID tag and manufacturing method thereof for which it is not necessary to DC-make holes in a patch antenna for power supply, and does not require a connection to the patch antenna.

Moreover, another object of the present invention is to provide an RFID tag and manufacturing method thereof for which an impedance conversion circuit is not necessary.

Furthermore, another object of the present invention is to provide an RFID tag and manufacturing method thereof that is small and thin and has high gain.

RFID Tag

This invention is an RFID tag having a tag antenna and an LSI chip, comprising: a power-supply pattern on which the LSI chip is mounted; a patch antenna that functions as the tag antenna; and a high-frequency connection section that high-frequency connects the power-supply pattern with the patch antenna.

The RFID tag of the present invention, further comprises: a dielectric member having the power-supply pattern, patch antenna and high-frequency connection section formed on one side, and a conductive pattern that functions as ground formed on the other side; and a short-circuit unit that forms a short circuit between one edge of the patch antenna and ground along the side surface of the dielectric member.

In the RFID tag of this invention, a typical power-supply pattern is a dipole antenna, monopole antenna or loop antenna.

In the RFID tag of this invention described above, a slot is formed in the patch antenna (first path antenna), and one end of a small dipole antenna that functions as a power-supply pattern is layered over the slot so that it crosses over the slot, and power is supplied from the small dipole antenna to the patch antenna.

In the RFID tag of this invention described above, a cutout section is formed in the patch antenna, one end of a small dipole antenna that functions as a linear antenna is high-frequency connected with the cutout section, and power is supplied from the small dipole antenna to the patch antenna.

In the RFID tag of this invention described above, the LSI chip is mounted in the center of the small dipole antenna, and another patch antenna (second patch antenna) is placed so that it has left-right symmetry with the first patch antenna with the LSI chip being in the center; and the positional relationship between the first patch antenna and one end of the small dipole antenna, and the positional relationship between the second patch antenna and other end of the dipole antenna are the same.

Manufacturing Method for an RFID Tag

This invention is a manufacturing method for an RFID tag having a tag antenna and an LSI chip, comprising steps of: forming a power-supply pattern on which an LSI chip is mounted, and a patch antenna that functions as a tag antenna on the surface of a double-sided print board by etching, so that the power-supply pattern and tag antenna are high-frequency connected; making a conductive pattern on the rear surface of the print board ground; and mounting the LSI chip on the power-supply pattern to create the RFID tag.

This invention comprises: a power-supply pattern on which the LSI chip is mounted; a patch antenna that functions as the tag antenna; and a high-frequency connection section that high-frequency connects the power-supply pattern with the patch antenna, and since power is supplied in high-frequency from the power-supply pattern to the patch antenna, there is no need to makes holes in the patch antenna, making it possible to simplify the processing of the RFID tag and lower the processing cost.

Also, this invention uses a patch antenna as the tag antenna, so it is not affected by the material properties of the ground side, therefore, the communication distance does not become poor even when the antenna is attached to a metal or an object including liquid.

Moreover, with this invention, the gain of the patch antenna is greater than a loop antenna or the like, and by adjusting the thickness, conductivity of the metal, dielectric loss or the like, it is possible to make the gain of the patch antenna even greater, and to make the size smaller.

Furthermore, with this invention, by connecting a loop pattern that functions as a parallel inductor to the dipole antenna or monopole antenna that functions as a power-supply pattern, and adjusting the dimensions of that pattern or adjusting the length of the power-supply pattern, the slot length, cutout length or the like, it is possible to match impedance with the LSI chip, and thus an impedance conversion circuit is not necessary.

Other features and advantages of the present invention will be apparent from the following description taken in conjunction with the accompanying drawings.

BRIEF DESCRIPTION OF THE DRAWINGS

FIG. 2 is a drawing explaining the radio waves that are emitted from a patch antenna.

FIG. 5 shows various simulation results as the frequency changes from 850 MHz to 980 MHz.

FIG. 11 is a drawing explaining the impedance plot when the parallel inductor dimension s2 is adjusted, and the frequency on the Smith chart is changed.

FIG. 16 shows various simulation results for the fourth embodiment as the frequency changes from 850 MHz to 980 MHz.

FIG. 28 is a drawing explaining a sixth embodiment of the invention.

FIG. 32 is a drawing showing and example of the construction of a patch antenna that is capable of emitting and receiving circularly polarized electric waves.

DESCRIPTION OF THE PREFERRED EMBODIMENTS (A) Embodiment 1

Figure 1:
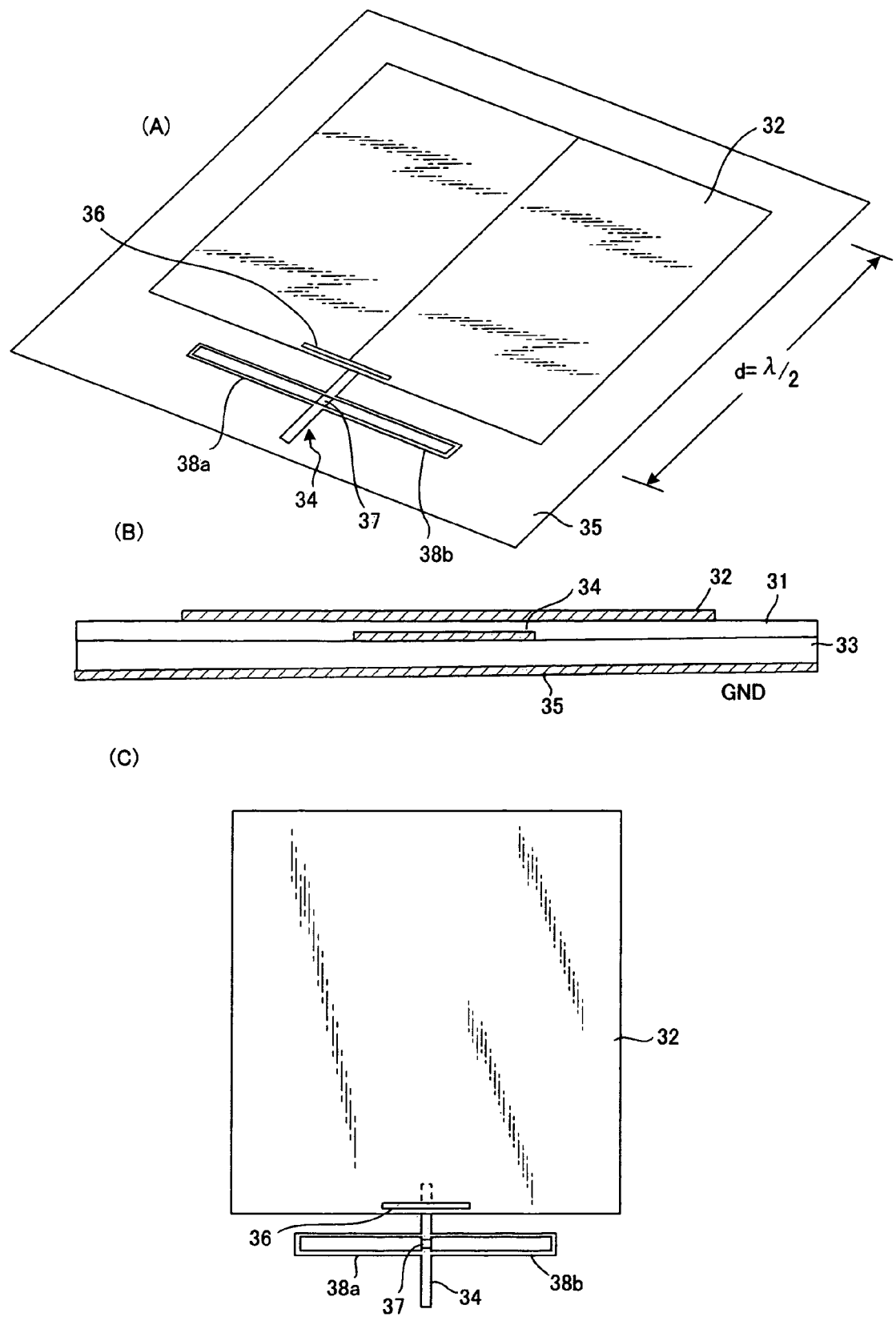
FIG. 1 is a drawing explaining the RFID tag of a first embodiment of the present invention.

FIG. 1 is a drawing explaining the RFID tag of a first embodiment of the invention, where (A) of FIG. 1 is a pictorial view of the case in which the dielectric layer is removed, (B) of FIG. 1 is a side view of in which the dielectric layer is transparent, and (C) of FIG. 1 is a top view that shows the positional relationship between the patch antenna and a small dipole antenna. In the side view, in order to make the construction easy to understand, the thickness of each part is shown thicker than the actual size.

The RFID tag of this first embodiment is constructed by layering a patch antenna 32 that is formed by printing or etching on an insulating film 31 (see (B) of FIG. 1), a small dipole antenna 34 that is formed by etching the surface of a double-sided printed board 33, and ground (GND) 35 that is formed by a conductive pattern on the backside of the printed board 33. A flexible thermoplastic such as polyethylene terephthalate (PET), polyimide (PI), polyethylene naphthalate (PEN), or polyvinyl chloride (PVC) can be used as the insulating film 31. A dipole antenna having a very short length compared to the wavelength λ is called a small dipole antenna. A dipole antenna is a kind of linear antenna.

In order to make a high-frequency connection between the patch antenna 32 and the small dipole antenna 34, a long, narrow slot 36 having predetermined dimensions is formed in the patch antenna 32. The small dipole antenna 34 is straight and has a predetermined line width, and the LSI chip 37 of the RFID tag is mounted in the center section of the small dipole antenna 34 using a chip bonding technique, and conductive patterns (parallel inductors) 38a, 38b for adjusting the impedance are connected to the left and right of the small dipole antenna 34. The straight section on one end of the small dipole antenna 34 is layered over the slot 36 that is formed in the patch antenna 32 so that it crosses over the slot, and the small dipole antenna 34 supplies power to the patch antenna 32 in the high frequency.

The parallel inductors 38a, 38b are created in a body with the small dipole antenna 34, and have predetermined line widths, and the lengths are adjusted so that the impedance of the tag antenna is matched with the impedance of the LSI chip 37. FIG. 1 shows an example of connecting two parallel inductors 38a, 38b, however, it is also possible to use only one. Also, it is possible to fold the straight section on the bottom side of the dipole antenna 34 to decrease the overall size.

As shown in (A) of FIG. 2, by making the size d of one side of the patch antenna λ/2, and causing the patch antenna to resonate at a predetermined frequency, or in other words, when a current J runs back and forth over the surface of the patch antenna, then as shown in (B) of FIG. 2, electric wave that is polarized in the Y-axis (horizontal) direction is emitted from the patch antenna in the vertical direction (Z-axis direction). This electric wave is not affected by the material characteristics of the grounded side of the patch antenna. Therefore, in the case of the RFID tag of this first embodiment, the communication distance does not become poor even when the tag is attached to a metal or material including liquid.

Also, the gain of the patch antenna is higher than that of a loop antenna, and by adjusting the thickness, the conductivity of the metal, the dielectric loss or the like, it is possible to increase the gain, so it is possible to make the size of the RFID tag of this first embodiment small.

Moreover, with the RFID tag of this first embodiment, it is possible to high-frequency connect the small dipole antenna, on which the LSI chip is mounted, to the patch antenna without a DC connection, so there is no need to form holes in the patch antenna, or to make a DC connection, and thus it is possible to simplify the process of manufacturing the RFID tag and lower the manufacturing cost.

Furthermore, by connecting loop patterns that function as parallel inductors to the small dipole antenna, and by adjusting the dimensions of that pattern, or by adjusting the length of the dipole antenna or length of the slot, it is possible to perform impedance matching between the tag antenna and LSI chip without having to use an impedance conversion circuit.

(B) Embodiment 2

(a) Construction

Figure 3:
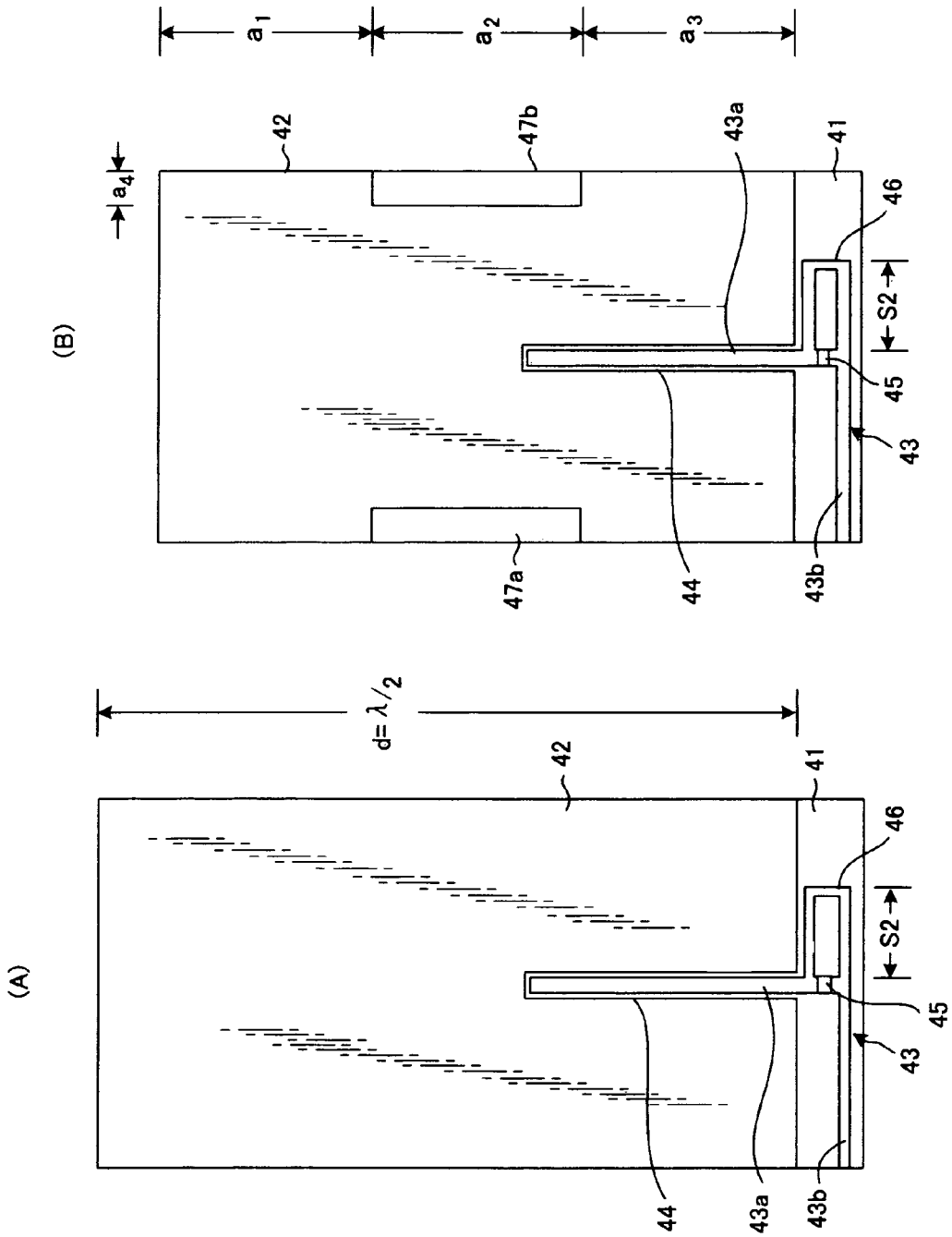
FIG. 3 is a top view of the RFID tag of a second embodiment of the present invention.

A top view of the RFID tag of a second embodiment is shown in (A) of FIG. 3. In the RFID tag of this second embodiment, a patch antenna 42 that functions as the tag antenna, and a small dipole antenna 43 are formed by etching the surface of a double-sided printed board 41, and a conductive pattern (not shown in the figure) on the rear surface of the printed board is used as ground. A long, thin cutout section 44 is formed in the center of the lower section of the patch antenna 42. In other words, the cutout section 44 is formed so that it is straight and extends in the direction toward the inside of the patch antenna 42, and a straight section 43a on one end of the small dipole antenna 43 is located inside the cutout section 44.

The small dipole antenna 43, which has a predetermined line width, comprises straight sections 43a, 43b that are bent into a reversed L shape, and the LSI chip 45 of the RFID tag is mounted near the bent section using a chip bonding technique. Also, a conductive pattern (parallel inductor) 46 for adjusting impedance is connected to the right side of the small dipole antenna 43. The parallel inductor 46 is created in a body with the small dipole antenna and has a predetermined line width, and the length s2 is such that it can be adjusted in order to match the impedance of the tag antenna with the LSI chip 37.

The straight section 43a on one end of the small dipole antenna is inserted into the long, thin cutout section 44 that is formed in the patch antenna 42, and a high-frequency connection between the small dipole antenna 43 and patch antenna 42 is realized by way of this cutout section. In other words, power is electromagnetically supplied from the small dipole antenna 43 to the patch antenna 42 in the high frequency.

The size d of one side of the patch antenna is made to be λ/2, and when the patch antenna is made to resonate at a predetermined frequency, or in other words, when a current J is made to run back and forth over the surface of the patch antenna, similar to as in the case of the first embodiment, an electric wave is emitted in the vertical direction from the patch antenna. This electric wave is not affected by the material characteristics of the grounded side of the patch antenna. Therefore, in the case of the RFID tag of this second embodiment, the communication distance does not become poor even when the tag is attached to a metal or material including liquid.

An example of rectangular cutout sections 47a, 47b that are formed on the end sections of a patch antenna for reducing the size of the board is shown in (B) of FIG. 3, where the cutouts are formed so that the electrical length (a1+a2+a3+2×a4) becomes about half the wavelength. By doing this, it is possible to shorten the dimension of the vertical size by 2×a4. However, when a4 is made too large, the antenna gain decreases, so a proper value must be used.

In this second embodiment shown in (A) and (B) of FIG. 3, both the patch antenna 42 and small dipole antenna 43 were formed on the surface of the same dielectric body, however, it is also possible for them to be layered; the manufacturing method for each will be described later. Also, the small dipole antenna 43 was bent into a reversed L shape in order to reduce the size of the board, however, if no importance is placed on size, the small dipole antenna 43 does not need to be bent.

Figure 4:
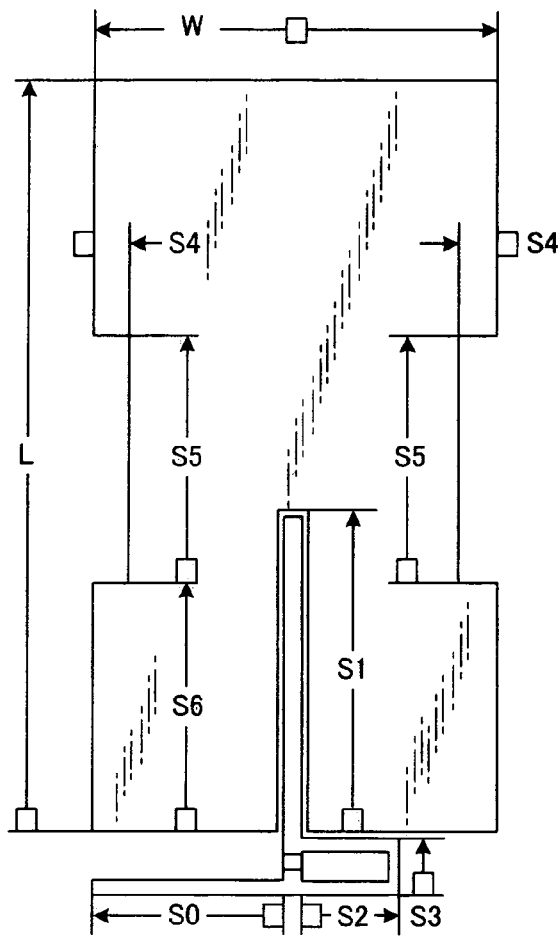
FIG. 4 is a drawing showing the actual dimensions and board characteristics of the RFID of the second embodiment.

The actual dimensions and board characteristics of the RFID tag shown in FIG. 3 are shown in (A) and (B) of FIG. 4, where the size of the board is 78 mm×44 mm×1.2 mm. Also, the line width of one end 43a of the small dipole antenna is 2.0 mm, the line width of the other end 43b is 1.0 mm, the space between the cutout 44 and the small dipole antenna 43 is 0.5 mm, and the space between the parallel inductor 46 and tip end of the patch antenna is 0.5 mm.

Various characteristics have been simulated for the RFID tag of this second embodiment that has the dimensions and board characteristics shown in FIG. 4 as the frequency applied to the patch antenna is changed from 850 MHz to 980 MHz. The minimum required power for operating the LSI chip is −10.00 dBm, the power supplied to the reader/writer antenna is 27.00 dBm, and the gain thereof is 9.00 dBi.

(b) Characteristics

FIG. 5 shows various simulation results as the frequency was changed from 850 MHz to 980 MHz; where: (1) the susceptance Bcp, resistance Rc, reactance Xc of the LSI chip; (2) the resistance Ra, reactance Xa, matching coefficient q, S parameter S11 and gain of the tag antenna; and (3) the communication distance when a linearly polarized wave antenna and a circularly polarized wave antenna are used as the antenna for the reader/writer are shown. The tag antenna is the combination of the patch antenna and small dipole antenna.

Matching Characteristic

Figure 6:
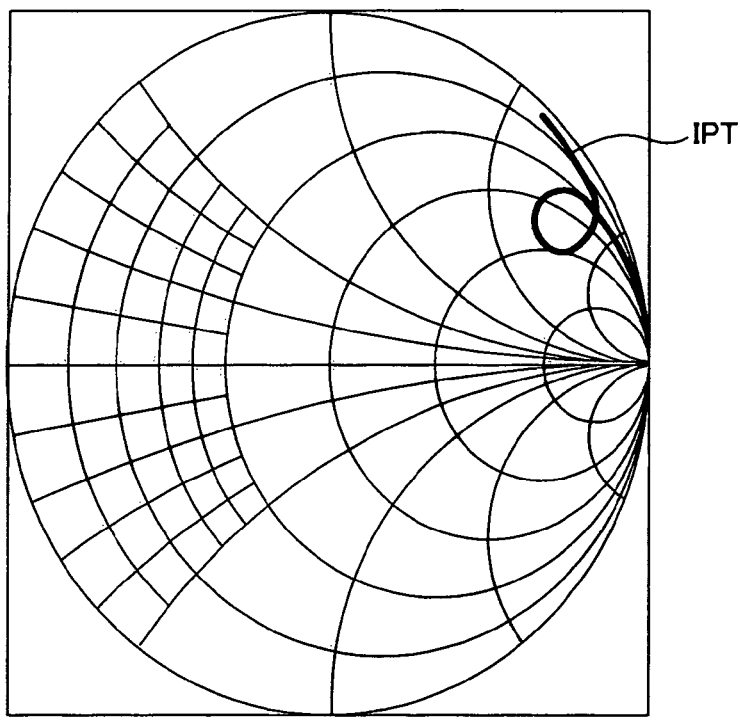
FIG. 6 is a Smith chart showing the impedance of a tag antenna.

FIG. 6 is a Smith chart showing the impedance of the tag antenna, and when the frequency changes from 850 MHz to 980 MHz, the impedance of the tag antenna changes as a circle, as shown by the impedance locus IPT. Also, from the characteristics results shown in FIG. 5, the impedance of the tag antenna near a frequency of 950 to 953 MHz becomes a value that is nearly matched with the input impedance of the LSI chip 45.

Figure 7:
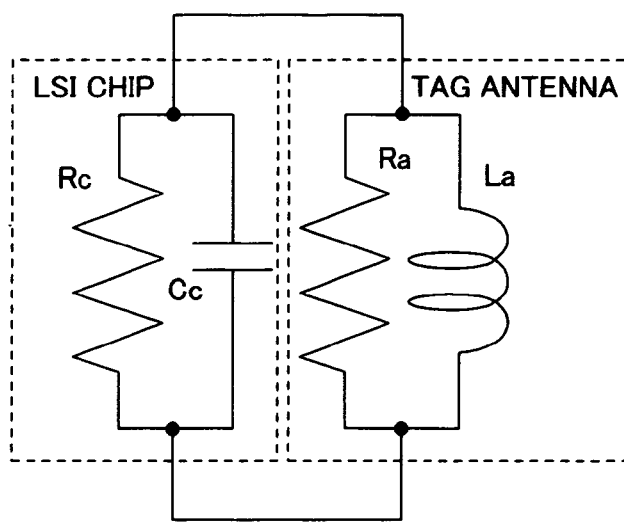
FIG. 7 is a drawing of an equivalent circuit of an RFID tag that comprises an LSI chip and tag antenna.

An equivalent circuit of an RFID tag that comprises an LSI chip and tag antenna is shown in FIG. 7. In other words, the equivalent circuit is expressed as a parallel circuit of the LSI chip and tag antenna, where the LSI chip is represented as a parallel circuit of a resistance Rc and capacitance Cc (the reactance is Xc), and the tag antenna is represented by a parallel circuit of a resistance Ra and inductance La (the reactance is Xa). The matching conditions in this RFID tag are that Rc=Ra, and |Xc|=Xa, and as can be seen from FIG. 5, at a frequency near 950 to 953 MHz, the RFID tag of this second embodiment satisfies the matching conditions.

Gain Characteristic and S11 Characteristic

Figure 8:
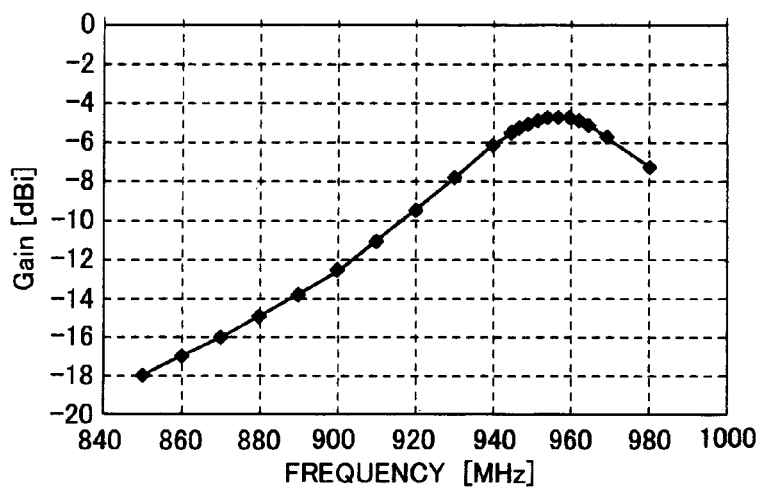
FIG. 8 is a drawing showing the gain characteristics of a tag antenna as the frequency changes from 850 MHz to 980 MHz.

FIG. 8 shows the gain of the tag antenna as the frequency changes from 850 MHz to 980 MHz, and when the patch antenna resonates at a frequency near 953 MHz, a high gain is obtained.

Figure 9:
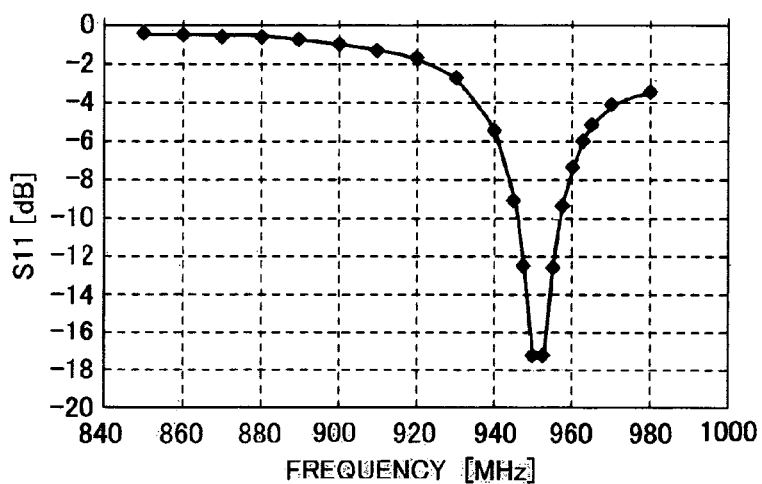
FIG. 9 is a drawing showing the S parameter (S11) characteristics as the frequency changes from 850 MHz to 980 MHz.

FIG. 9 shows the S pattern S1 characteristic as the frequency changes from 850 MHz to 980 MHz. The S pattern S11 indicates the degree of impedance matching with the LSI chip, and has a minimum value at a frequency near 950 to 953 MHz.

Communication Distance

Figure 10:
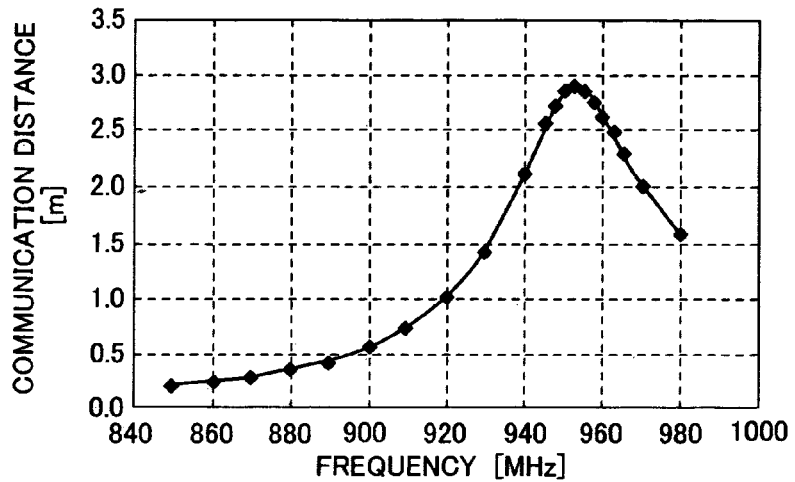
FIG. 10 is a drawing showing the communication distance characteristics as the frequency changes from 850 MHz to 980 MHz.

FIG. 10 shows the communication distance as the frequency changes from 850 MHz to 980 MHz, and when a linearly polarized wave antenna is used as the antenna of the reader/writer, the communication distance becomes a maximum at a frequency near 953 MHz. The communication distance r of the RFID tag is given by the equation below.

$$r = \frac{\lambda}{4\pi} \sqrt{\frac{Pt \cdot Gt \cdot Gr \cdot q}{Pth}} \quad 1$$

$$q = \frac{4Rc \cdot Ra}{|Zc + Za|^2}$$

Here, $\lambda$ is the wavelength, Pt is the power applied to the reader/writer antenna, Gt and Gr are the respective antenna gains of the tag antenna and reader/writer antenna, and Pth is the minimum value of the power required for the LSI chip to operate. Also, Zc and Za are the complex impedances of the LSI chip and tag antenna, respectively.

Matching Adjustment

Depending on the dimensions of the parallel inductor 46, there are cases in which impedance matching between the tag antenna and LSI chip is not possible. In that case, the length s1 of the small dipole antenna or the dimension s2 of the parallel inductor 46 or both s1 and s2 are adjusted. When the dimension s2 is increased, the circle of the impedance locus IPT that is drawn by changing the frequency on the Smith chart shown in (A) of FIG. 11, becomes a little larger moving in the direction of the arrow. This corresponds to the fact that the inductance La of the parallel inductor of the tag antenna in the equivalent circuit shown in FIG. 7 becomes large, and means that it is possible to cancel out an even larger parallel capacitance Cc of the tag LSI. On the other hand, when the dimension s1 becomes larger, then as shown in (B) of FIG. 11, the impedance locus moves in the direction that the size of the circle becomes larger without much clockwise or counter-clockwise rotation. This corresponds to the fact that the parallel resistance Ra of the tag antenna in the equivalent circuit shown in FIG. 7 becomes small, and means that it is possible to cancel out an even smaller parallel resistance of the tag LSI. Therefore, by adjusting the dimension s2 or the dimension s1 or both dimensions s1 and s2, the impedance locus IPT moves, and impedance matching can be obtained at a desired frequency.

(c) Effect

With this second embodiment, the emitted electric wave is not affected by the material on the grounded side of the patch antenna. Therefore, the communication distance does not become poor even when the RFID tag of this second embodiment is attached to a metal or an object including liquid.

Also, the gain of the patch antenna is higher than that of a loop antenna, and by adjusting the thickness, conductivity of the metal, dielectric loss or the like, it is possible to make the gain even greater, and thus it is possible to make the size of the RFID tag of this second embodiment small.

Moreover, with the RFID tag of this second embodiment the small dipole antenna on which the LSI chip is mounted and the patch antenna are only high-frequency connected without being connected by a DC connection, so there is no need to form holes in the patch antenna, as well as there is no need for a DC connection, making it possible to simplify the process of manufacturing the RFID tag and to reduce the manufacturing cost.

Also, by connecting a loop pattern that functions as a parallel inductor to the small dipole antenna and by adjusting the dimensions of that pattern, or by adjusting the length s0 of the straight section 43b of the dipole antenna or the length s1 of the cutout section, it is possible to perform impedance matching with the LSI chip without having to use an impedance conversion circuit.

(C) Embodiment 3

Figure 12:
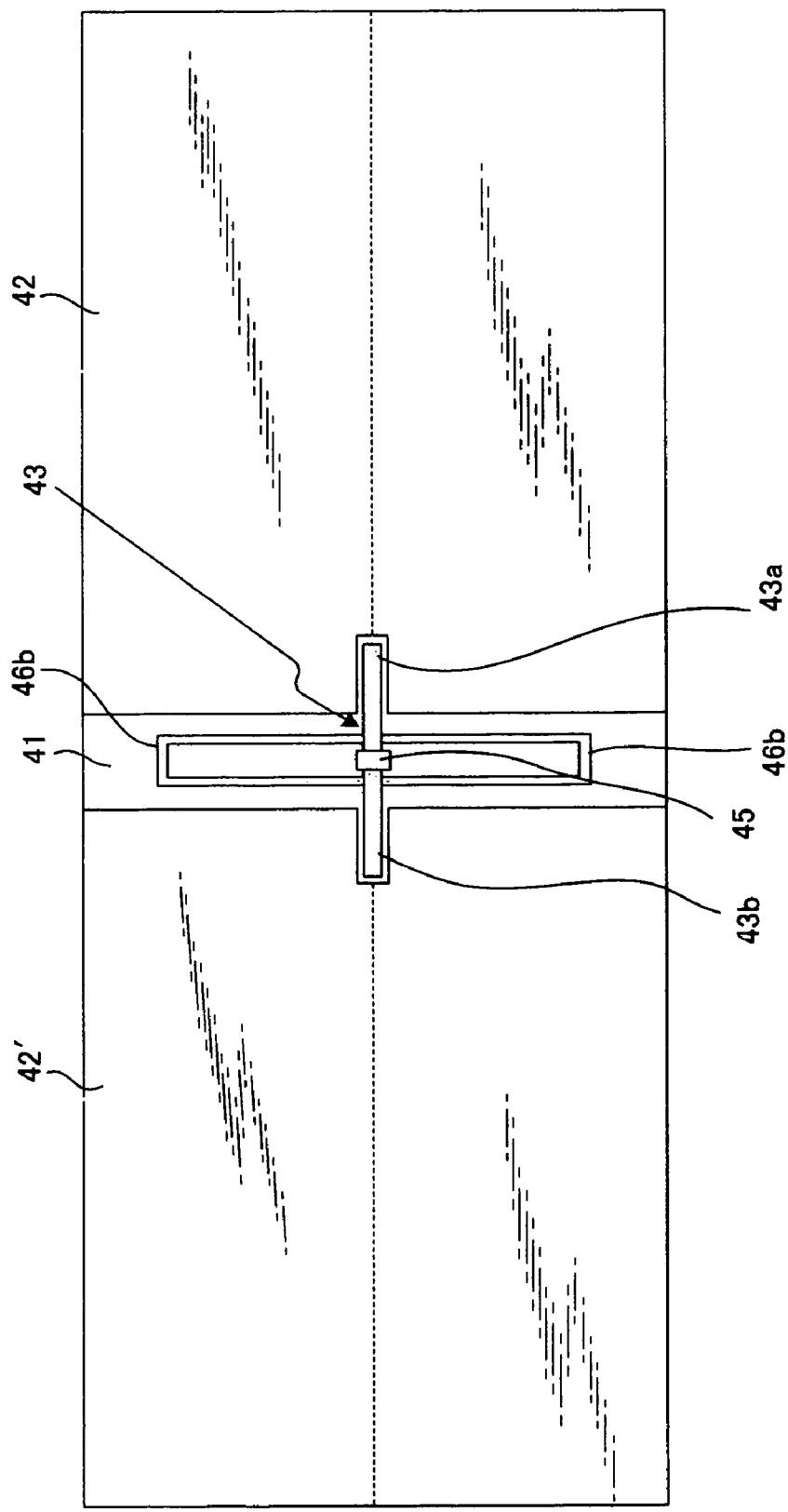
FIG. 12 is a top view of the RFID tag of a third embodiment of the invention.

FIG. 12 is a top view of the RFID tag of a third embodiment of the invention, where two of the tag antennas of the second embodiment shown in (A) of FIG. 3 are connected in parallel.

Two patch antennas 42, 42' that function as the tag antenna, and a small dipole antenna 43 are formed on the top surface of a double-sided print board 41, and a conductive pattern is formed on the rear surface of the board (not shown in the figure) as ground. An LSI chip 45 is mounted in the center of the straight small dipole antenna 43, and the patch antenna 42 and patch antenna 42' are formed so that they are symmetrical on the left and right with that LSI chip in the center. Also, the positional relationship between the patch antenna 42 and one end 43a of the small dipole antenna, and the positional relationship between the patch antenna 42' and the other end 43b of the small dipole antenna, are exactly the same. Furthermore, parallel inductors 46a, 46b are symmetrically connected to the upper and lower side of the small dipole antenna 43.

With the RFID antenna of this third embodiment, it is possible to increase the gain of the tag antenna, and to transmit electric waves a far distance, however, the size is doubled.

Figure 13:
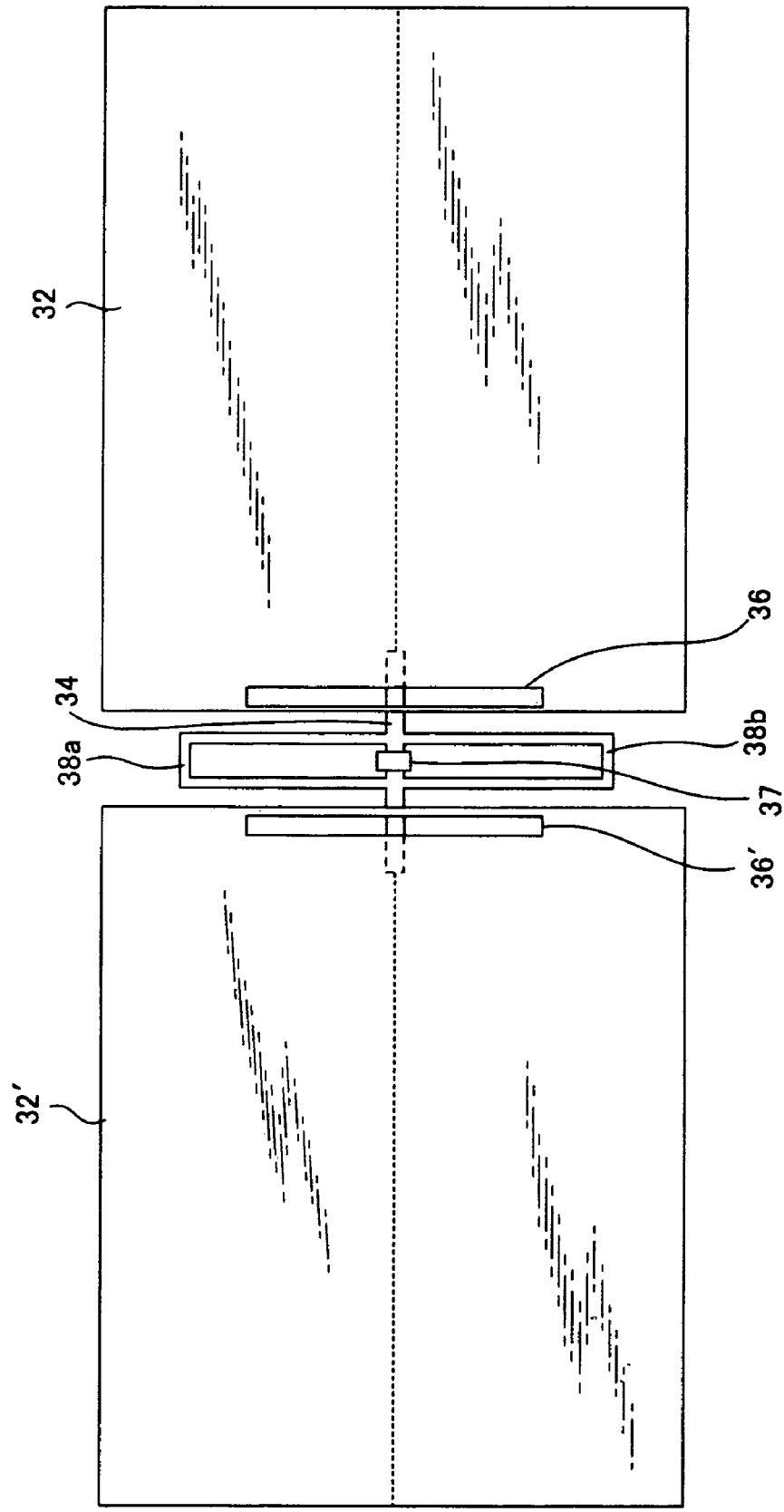
FIG. 13 is a top view of the case in which tag antennas of the first embodiment are connected in parallel.

FIG. 13 is a top view of two of the tag antennas of the first embodiment connected in parallel, and they have the same effect as the RFID tag of this third embodiment.

(D) Embodiment 4

(a) Construction

Figure 14:
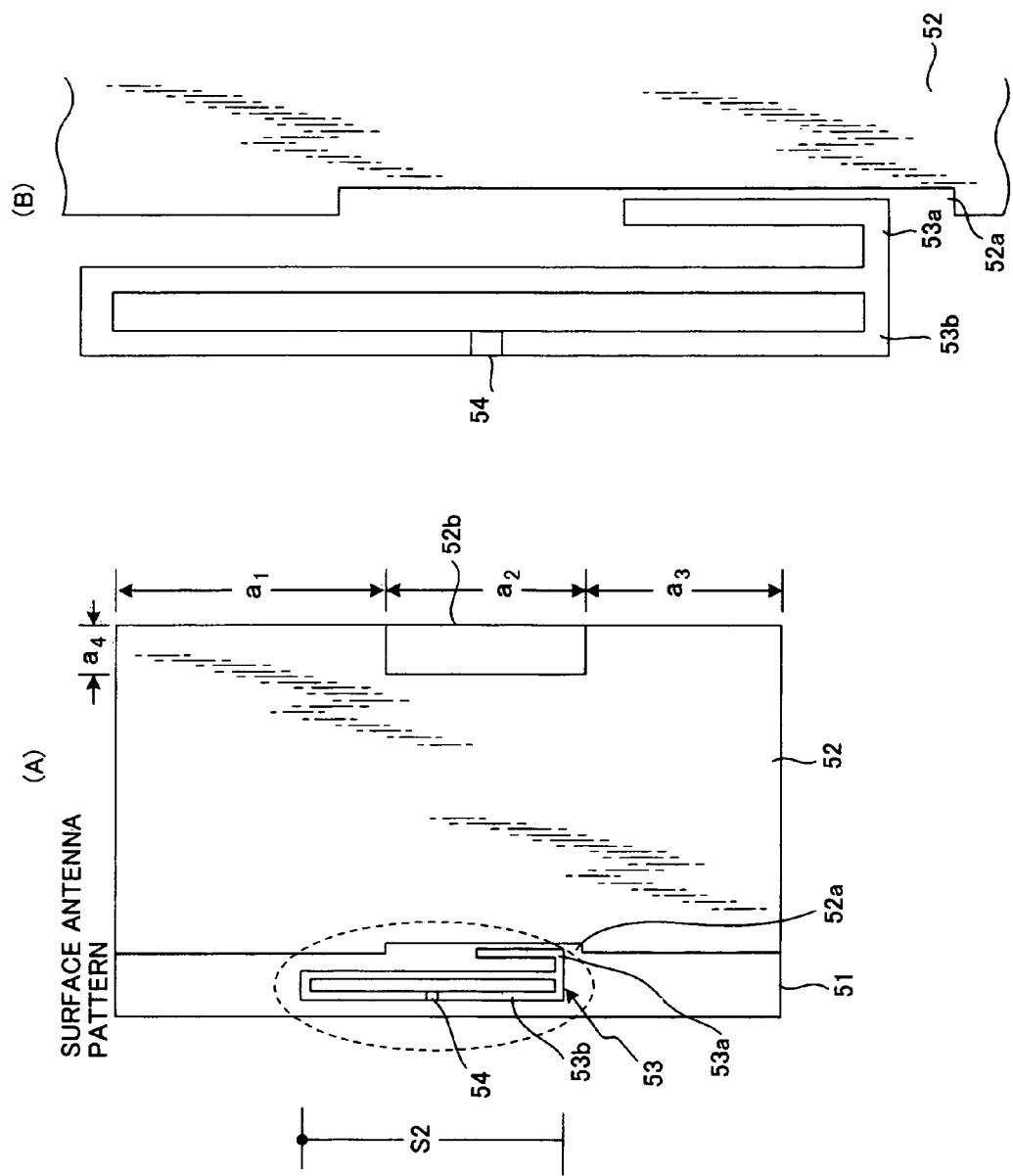
FIG. 14 is a top view of the RFID tag of a fourth embodiment of the present invention.

Top views of the RFID tag of a fourth embodiment of the invention are shown in (A) and (B) of FIG. 14, where (A) of FIG. 14 shows the entire RFID tag, and (B) of FIG. 14 is an enlarged view of the section inside the dashed line. In the RFID tag of this fourth embodiment, a patch antenna 52 that functions as the tag antenna and a small monopole antenna 53 are etched on the surface of a double-sided print board, and a conductive pattern (not shown in the figure) that is formed on the rear surface of the board is used as ground. A monopole antenna having a length that is much shorter than the wavelength λ is referred to here as a small monopole antenna. A monopole antenna is a kind of linear antenna.

A shallow cutout section 52a is formed on the left side end of the patch antenna 52, and an antenna section 53a, having a predetermined line width, of the small monopole antenna 53 is placed inside the cutout section 52a. A high-frequency connection between the small monopole antenna 53 and patch antenna 52 is realized by way of the cutout section 52a. In other words, power is supplied in the high frequency from the small monopole antenna 53 to the patch antenna 52. In order to make the size of the board on the right end section of the patch antenna 52 small, a cutout section 52b is formed so that the electrical length (a1+a2+a3+2×a4) is roughly equal to λ/2.

A loop shaped electrically conductive pattern (parallel inductor) 53b for adjusting impedance is connected to the tip end of the reversed L shaped antenna section 53a of the small monopole antenna 53, and the LSI chip 54 of the RFID tag is mounted in the middle section of the loop using a chip bonding technique. The parallel inductor 53b has a predetermined line width and is created in a body with the small monopole antenna, and the length s2 is adjusted so that the impedance of the tag antenna is matched with the impedance of the LSI chip 54.

By making the length of one side of the patch antenna 52 to be λ/2 and resonating the patch antenna at a predetermined frequency, or in other words, by running a current J back and forth over the surface of the patch antenna, an electric wave is emitted from the patch antenna in the vertical direction as in the case of the first and second embodiments described above. Therefore, the communication distance does not become poor even though the RFID tag of this fourth embodiment is attached to a metal or an object including liquid.

In this fourth embodiment shown in FIG. 14, the patch antenna 52 and the small monotone antenna 53 are formed on the same dielectric body, however, it is also possible for them to be layered; the manufacturing method for each will be described later.

Figure 15:
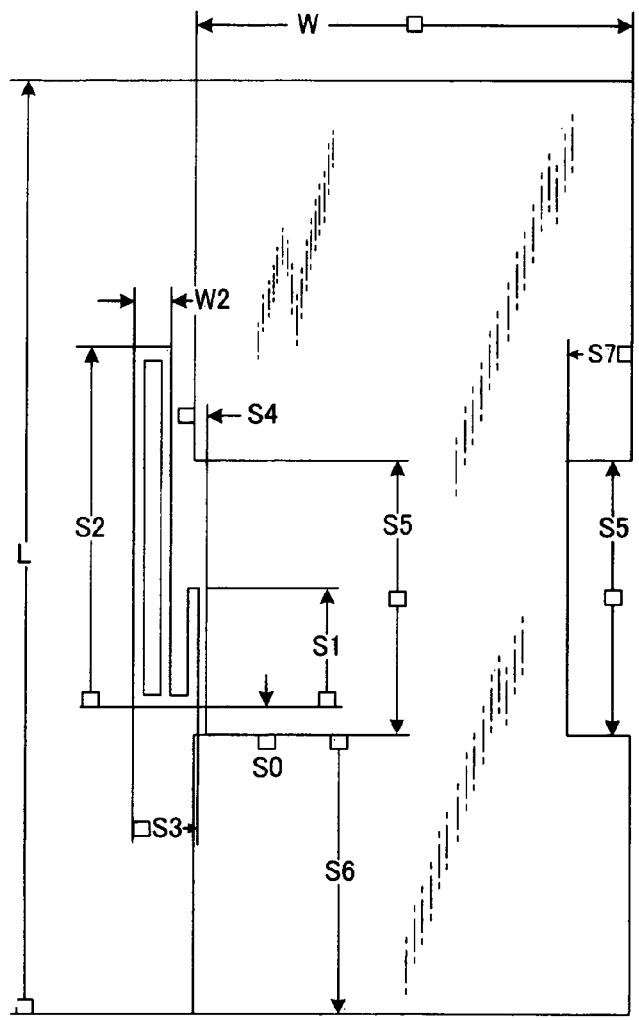
FIG. 15 is a drawing showing the actual dimensions and board characteristics of the RFID tag of the fourth embodiment.

The actual dimensions and board characteristics of the RFID tag shown in FIG. 14 are shown in (A) and (B) of FIG. 15, where the board size is 78 mm×40 mm×1.2 mm. Also, the line width of the small monopole antenna is 1.0 mm, and the space between the cutout section 52a and the small monopole antenna 53 is 0.5 mm.

(b) Characteristics

Various characteristics have been simulated for the RFID tag of this fourth embodiment that has the dimensions and board characteristics shown in FIG. 15 as the frequency applied to the patch antenna is changed from 850 MHz to 980 MHz. The minimum required power for operating the LSI chip is −10.00 dBm, the power supplied to the reader/writer antenna is 27.00 dBm, and the gain is 9.00 dBi.

FIG. 16 shows various simulated results as the frequency was changed from 850 MHz to 980 MHz; where: (1) the susceptance Bcp, resistance Rc, reactance Xc of the LSI chip; (2) the resistance Ra, reactance Xa, matching coefficient q, S parameter S11 and gain of the tag antenna; and (3) the communication distance when a linearly polarized wave antenna and a circularly polarized wave antenna are used as the antenna for the reader/writer are shown.

Matching Characteristic

Figure 17:
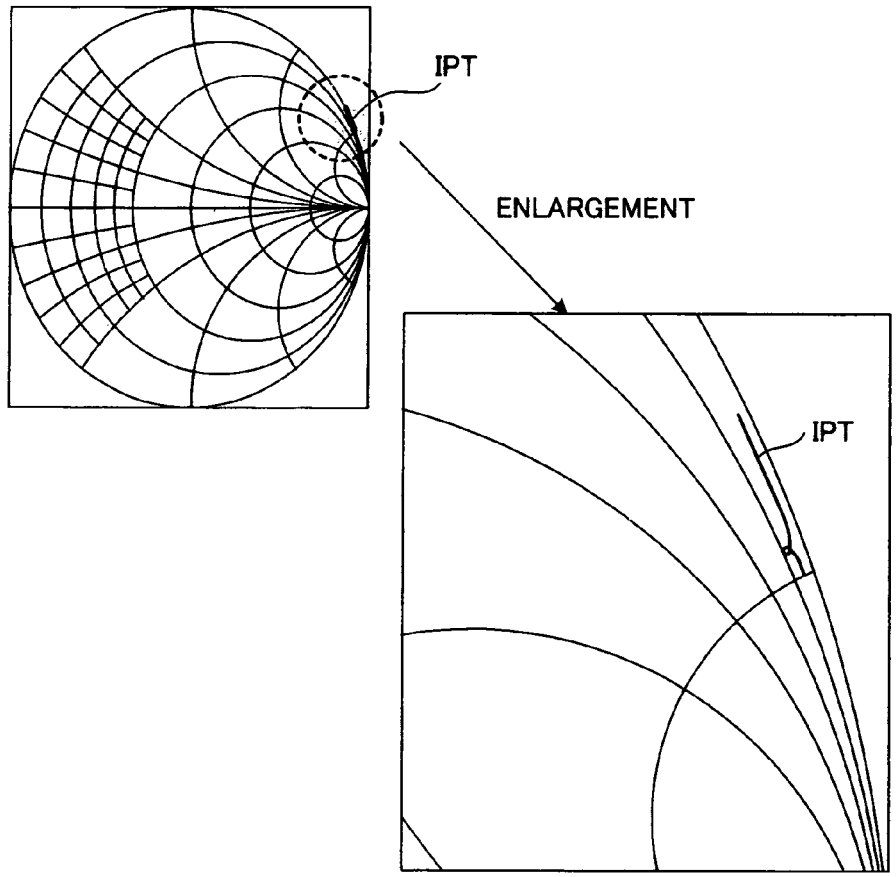
FIG. 17 is a Smith chart showing the impedance of a tag antenna.

FIG. 17 is a Smith chart showing the impedance of the tag antenna, and as the frequency changes from 850 MHz to 980 MHz, the impedance of the tag antenna changes as a small circle, as shown by the impedance locus IPT. Also, from the characteristics results shown in FIG. 16, the impedance of the tag antenna near a frequency of 953 MHz becomes a value that is nearly matched with the input impedance of the LSI chip 54.

Gain Characteristic and S11 Characteristic

Figure 18:
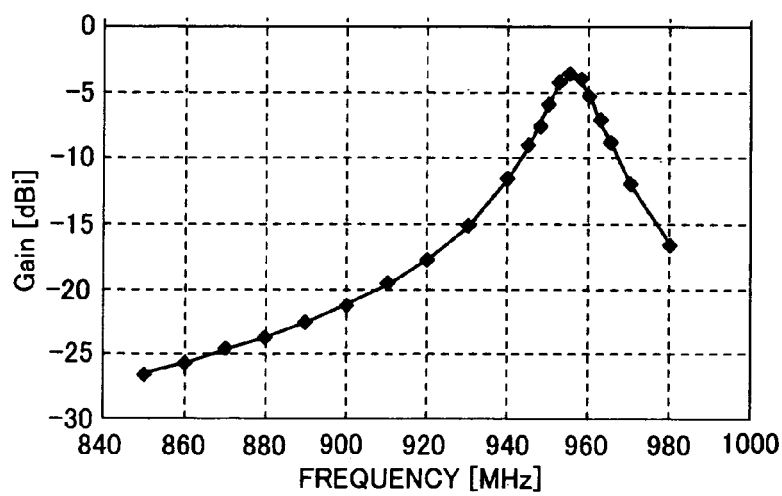
FIG. 18 is a drawing showing the gain characteristics of a tag antenna as the frequency changes from 850 MHz to 980 MHz.

FIG. 18 shows the gain of the tag antenna as the frequency changes from 850 MHz to 980 MHz, and when the patch antenna resonates at a frequency near 953 MHz, a high gain is obtained.

Figure 19:
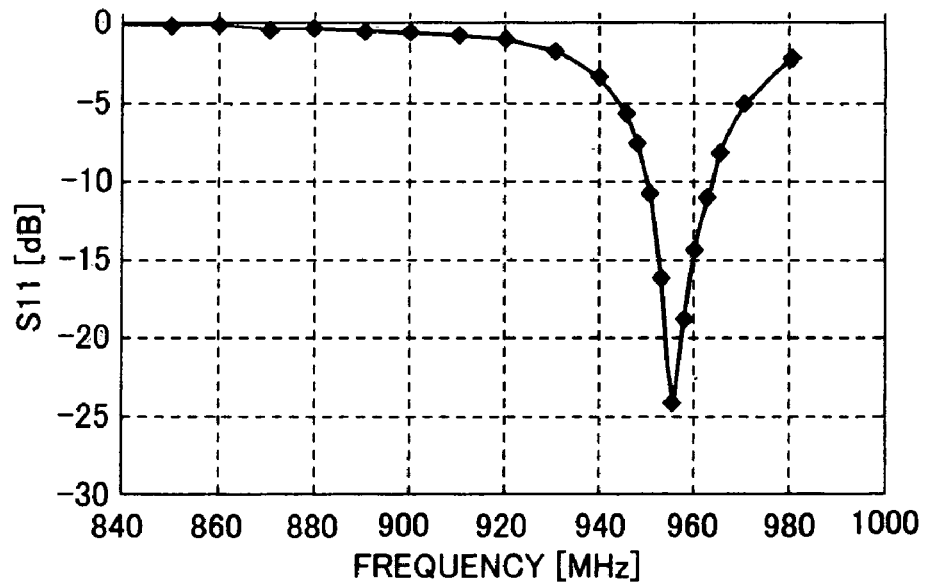
FIG. 19 is a drawing showing the S parameter (S11) characteristics as the frequency changes from 850 MHz to 980 MHz.

FIG. 19 shows the S pattern S11 characteristic as the frequency changes from 850 MHz to 980 MHz. The S pattern S11 indicates the degree of impedance matching with the LSI chip, and has a minimum value at a frequency near 953 MHz of −20 dB or less.

Communication Distance

Figure 20:
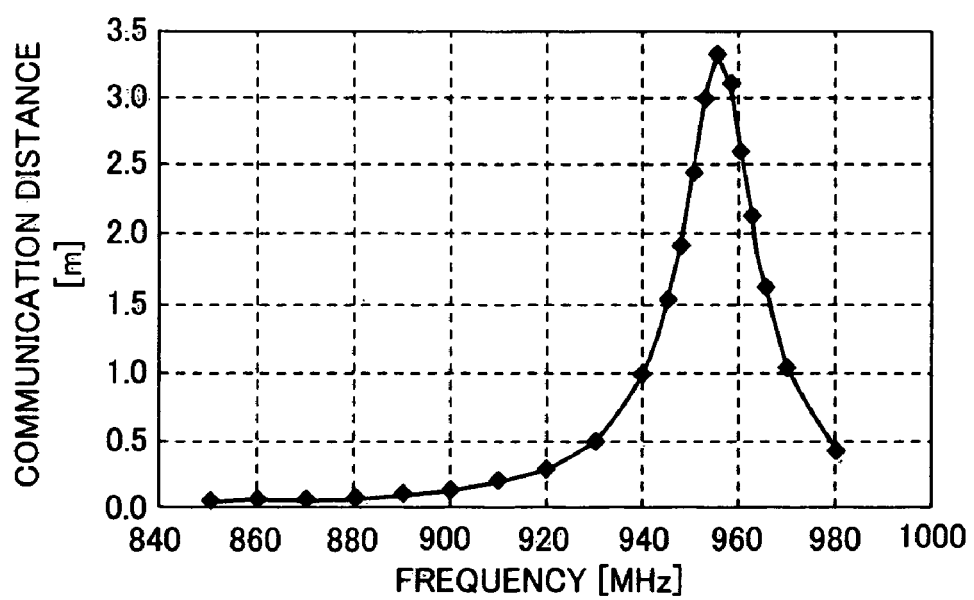
FIG. 20 is a drawing showing the communication distance characteristics as the frequency changes from 850 MHz to 980 MHz.

FIG. 20 shows the communication distance as the frequency changes from 850 MHz to 980 MHz, and when a linearly polarized wave antenna is used as the antenna of the reader/writer, the communication distance becomes a maximum at a frequency near 953 MHz.

Matching Adjustment

Figure 21:
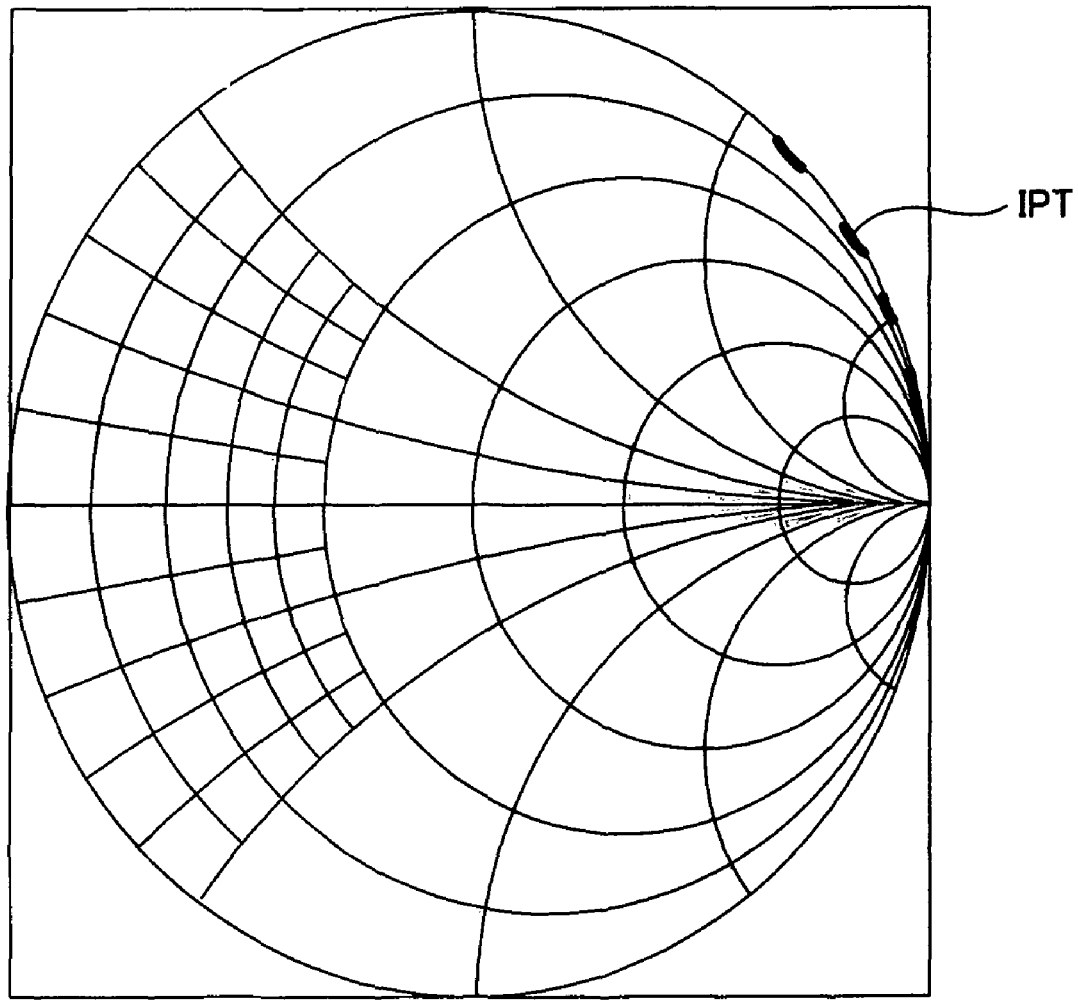
FIG. 21 is a drawing explaining the impedance plot when the parallel inductor dimension s2 is adjusted, and the frequency on the Smith chart is changed.

Depending on the dimensions of the parallel inductor 53b, there are cases in which impedance matching is not possible. In that case, the dimension s2 of the parallel inductor 53b is adjusted. When the dimension s2 is decreased, the circle of the impedance locus IPT which is drawn by changing the frequency on the Smith chart shown in FIG. 21, rotates counterclockwise. Therefore, by adjusting the dimension s2 and rotating the circle of the impedance locus IPT, impedance matching can be obtained at a desired frequency.

(c) Effect

With this fourth embodiment, the emitted electric wave is not affected by the material on the grounded side of the patch antenna. Therefore, the communication distance does not become poor even when the RFID tag of this fourth embodiment is attached to a metal or an object including liquid.

Also, the gain of the patch antenna is higher than that of a loop antenna, and by adjusting the thickness, conductivity of the metal, dielectric loss or the like, it is possible to make the gain even greater, and thus it is possible to make the size of the RFID tag of this fourth embodiment small.

Moreover, with the RFID tag of this fourth embodiment the small monopole antenna on which the LSI chip is mounted and the patch antenna are only high-frequency connected without being connected by a DC connection, so there is no need to form holes in the patch antenna, as well as there is no need for a DC connection, making it possible to simplify the process of manufacturing the RFID tag and to reduce the manufacturing cost.

Also, by connecting a loop pattern that functions as a parallel inductor to the small monopole antenna and by adjusting the dimension s2 of that pattern, or by adjusting the lengths s1 or s3 of the straight section of the monopole antenna, it is possible to perform impedance matching with the LSI chip without having to use an impedance conversion circuit.

(E) Embodiment 5

Figure 22:
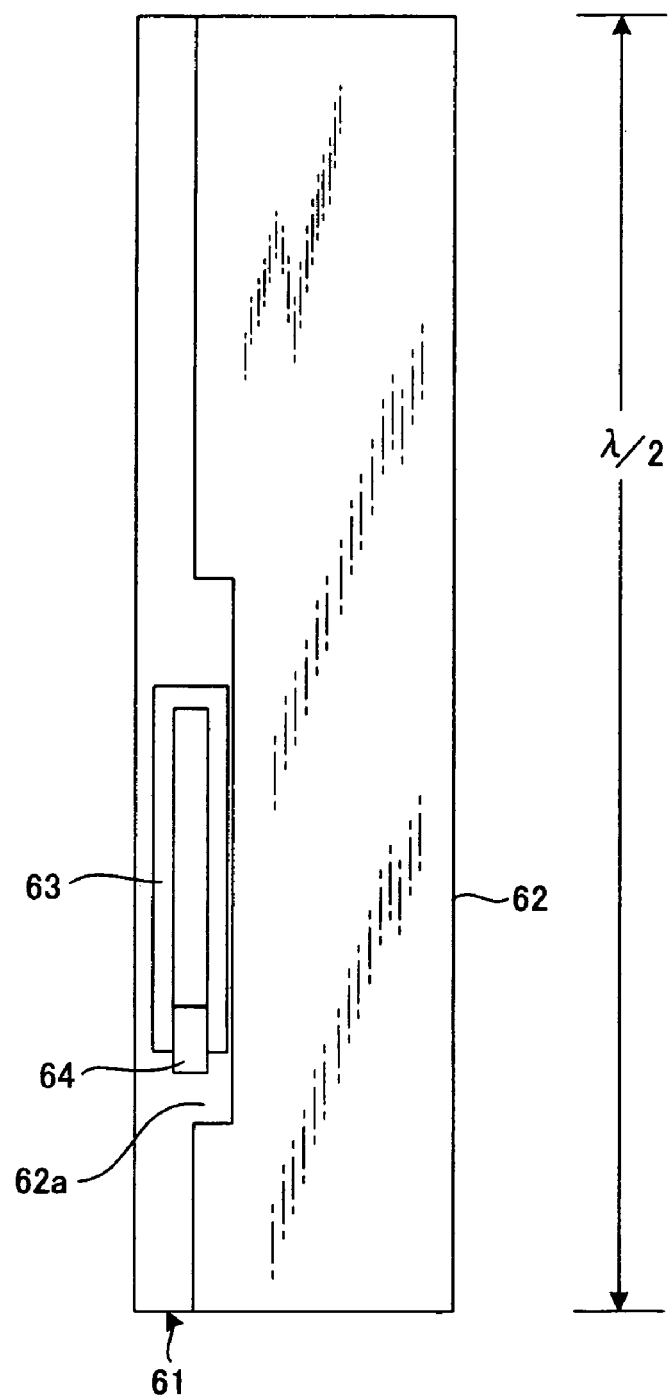
FIG. 22 is a top view of the RFID tag of a fifth embodiment.

In the fourth embodiment, a small monopole antenna 53 is placed in the shallow cutout section of the patch antenna 52 as a power supply pattern, and by high-frequency connecting the small monopole antenna 53 with the patch antenna 52, power is supplied from the small monopole antenna 53 to the patch antenna 52. However, construction is also possible in which a loop pattern having a predetermined line width is used instead of the small monopole antenna 53, and power is supplied to the patch antenna from that loop pattern.
(a) Construction FIG. 22 is a top view of the RFID tag of a fifth embodiment of the invention. In the RFID tag of this fifth embodiment, a patch antenna 62 that functions as the tag antenna, and a loop pattern 63 that functions as the power supply pattern are formed by etching them on the surface of a double-sided print board 61, and a conductive pattern (not shown in the figure) on the rear surface of the board is used as ground.

A shallow cutout section 62a is formed on the end section on the left side of the patch antenna 62, and the loop pattern 63, having a predetermined line width, is placed in this cutout section. A high-frequency connection between the loop pattern 63 and patch antenna 62 is realized by way of the cutout section, and power is supplied to the patch antenna 62 from the loop pattern 63 in the high frequency. The LSI chip 64 of the RFID tag is mounted on the lower end section of the loop pattern using a chip bonding technique. The length s2 (see FIG. 23) of the loop pattern 63 can be adjusted in order to match the impedance between the tag antenna and the LSI chip 64. By making the length of one side of the patch antenna 62 to be λ/2, and causing the patch antenna 62 to resonate at a predetermined frequency, or in other words, by running a current J back and forth over the surface of the patch antenna, an electric wave is emitted in the vertical direction from the patch antenna as in the case of the first and second embodiments described above. This electromagnetic wave is not affected by the material characteristics of the ground side of the patch antenna. Therefore, the communication distance does not become poor even though the RFID tag of this fifth embodiment is attached to a metal or an object including liquid.

In the fifth embodiment shown in FIG. 22, the patch antenna 62 and loop pattern 63 are formed on the surface of the same dielectric body, however, it is also possible for them to be layered, and the manufacturing method for each will be described later.

Figure 23:
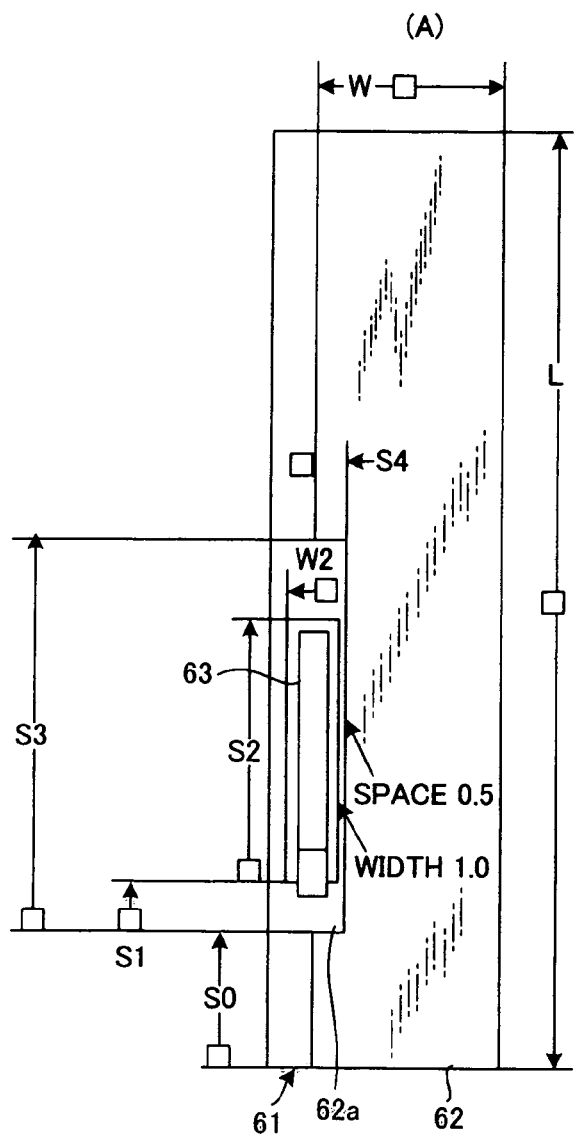
FIG. 23 is a drawing showing the actual dimensions and board characteristics of the RFID tag of the fifth embodiment.
Figure 24:
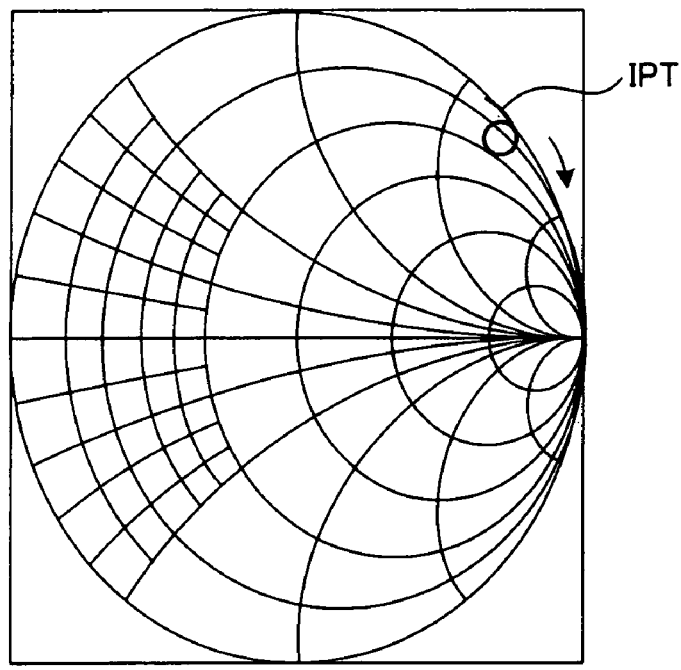
FIG. 24 is a Smith chart showing the impedance of a tag antenna.
Figure 25:
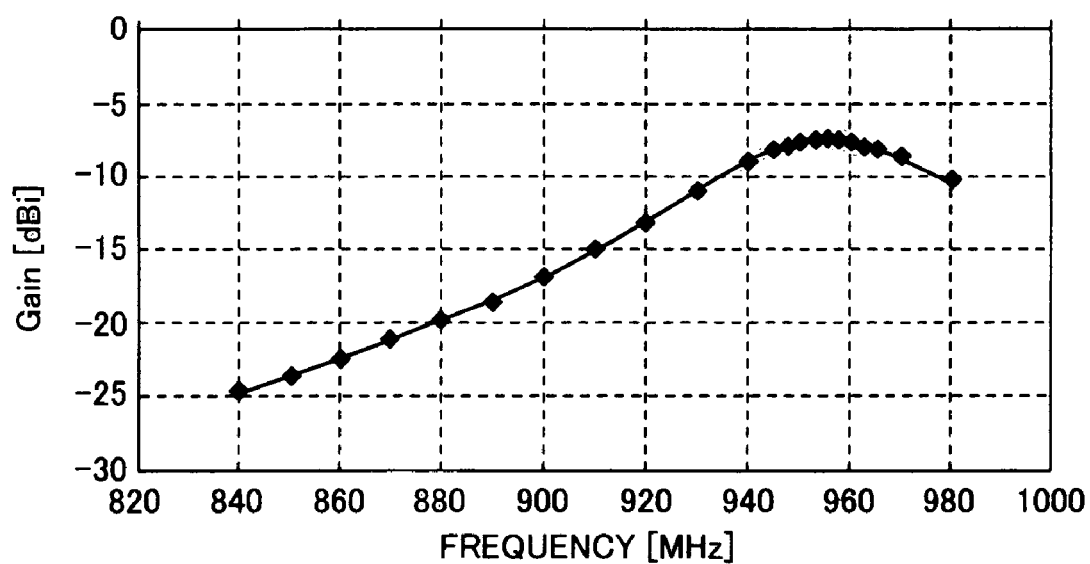
FIG. 25 is a drawing showing the gain characteristics of a tag antenna as the frequency changes from 840 MHz to 980 MHz.

The actual dimensions and board characteristics of the RFID tag shown in FIG. 22 are shown in (A) and (B) of FIG. 23. Also, the line width of the loop pattern 63 is 1.0 mm, and the space between the cutout section 62a and the loop pattern 63 is 0.5 mm.
(b) Characteristics Various characteristics have been simulated for the RFID tag of this fifth embodiment that has the dimensions and board characteristics shown in FIG. 23 as the frequency applied to the patch antenna is changed from 840 MHz to 980 MHz
Matching Characteristic FIG. 24 is a Smith chart showing the impedance of the tag antenna, and as the frequency changes from 840 MHz to 980 MHz, the impedance of the tag antenna changes as a small circle, as shown by the impedance locus IPT. Also, the impedance of the tag antenna near a frequency of 953 MHz becomes a value that is nearly matched with the input impedance of the LSI chip 64.
Gain Characteristic and S11 Characteristic FIG. 25 shows the gain of the tag antenna as the frequency changes from 840 MHz to 980 MHz, and when the patch antenna resonates at a frequency near 953 MHz, a high gain is obtained.

Figure 26:
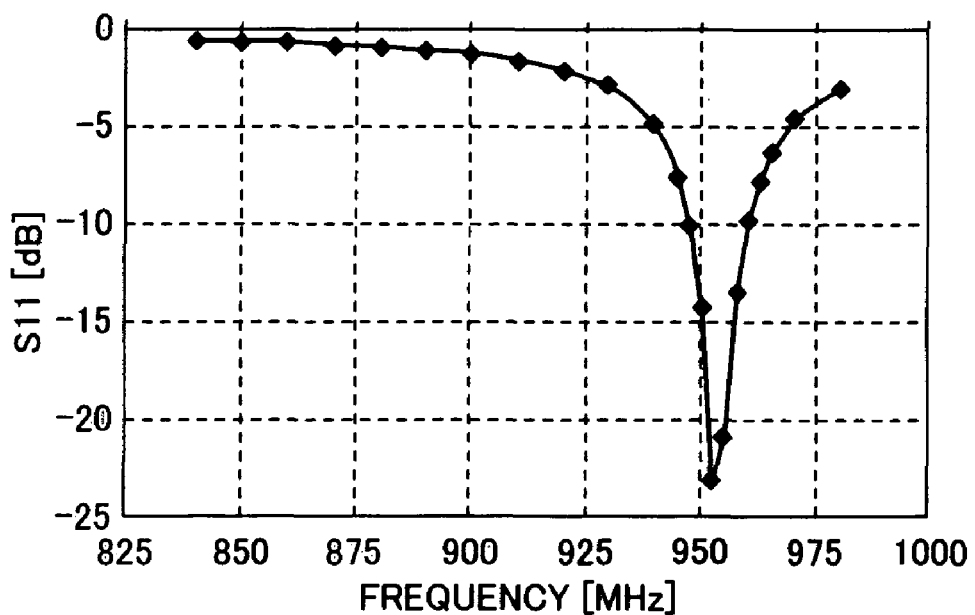
FIG. 26 is a drawing showing the S parameter (S11) characteristics as the frequency changes from 840 MHz to 980 MHz.
Figure 27:
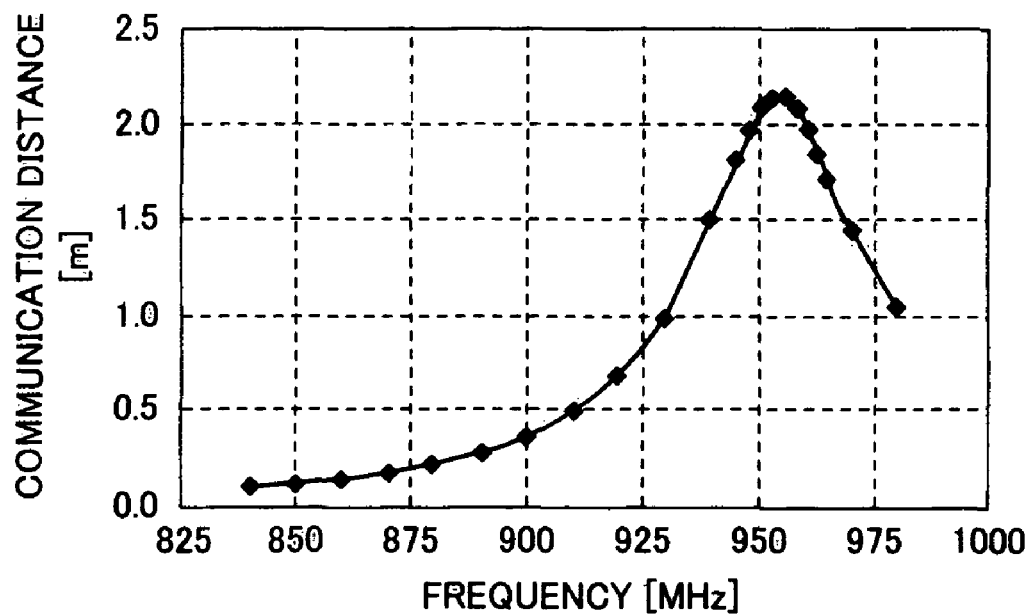
FIG. 27 is a drawing showing the communication distance characteristics as the frequency changes from 840 MHz to 980 MHz.

FIG. 26 shows the S pattern S11 characteristic as the frequency changes from 840 MHz to 980 MHz. The S pattern S11 indicates the degree of impedance matching with the LSI chip, and has a minimum value at a frequency near 953 MHz of −20 dB or less.
Communication Distance FIG. 27 shows the communication distance as the frequency changes from 840 MHz to 980 MHz, and when a linearly polarized wave antenna is used as the antenna of the reader/writer, the communication distance becomes a maximum at a frequency near 953 MHz. The communication distance is calculated presuming that the minimum power required for operation of the LSI chip is −10.00 dBm, the parallel resistance Rc of the LSI chip is 800Ω, the parallel capacitance Cc of the LSI chip is 1.2 pF, the reader/writer power is 27.00 dBm, and the gain is 9.00 dBi.
Matching Adjustment Depending on the dimensions of the loop pattern 63, there are cases in which impedance matching is not possible. In that case, the dimension s2 of the loop pattern 63 is adjusted. When the dimension s2 is decreased, the circle of the impedance locus IPT that is drawn by changing the frequency on the Smith chart, rotates counterclockwise (see arrow in FIG. 24). Therefore, by adjusting the dimension s2 and rotating the circle of the impedance locus IPT, impedance matching can be obtained at a desired frequency.
(c) Effect With this fifth embodiment, the emitted electric wave is not affected by the material on the grounded side of the patch antenna. Therefore, the communication distance does not become poor even when the RFID tag of this fifth embodiment is attached to a metal or an object including liquid.

Also, the gain of the patch antenna is higher than that of a loop antenna, and by adjusting the thickness, conductivity of the metal, dielectric loss or the like, it is possible to make the gain even greater, and thus it is possible to make the size of the RFID tag of this fifth embodiment small.

Moreover, with the RFID tag of this fifth embodiment the loop pattern on which the LSI chip is mounted and the patch antenna are only high-frequency connected and are not connected by a DC connection, so there is no need to form holes in the patch antenna, as well as there is no need for a DC connection, making it possible to simplify the process of manufacturing the RFID tag and to reduce the manufacturing cost.

Also, by adjusting the dimension s2 of the loop pattern, or by adjusting the length s3, it is possible to perform impedance matching with the LSI chip without having to use an impedance conversion circuit.

(F) Sixth Embodiment

This sixth embodiment of the present invention is an embodiment in which the size of the RFID tag is made more compact by forming a short circuit between one edge of the patch antenna and ground.

(a) Construction

FIG. 28 is a drawing explaining a sixth embodiment of the RFID tag of the present invention, where (A) is a pictorial view, (B) is a cross sectional view of section AA in (A), and (C) is a pictorial view as seen from the direction of arrow B in (A).

Figure 29:
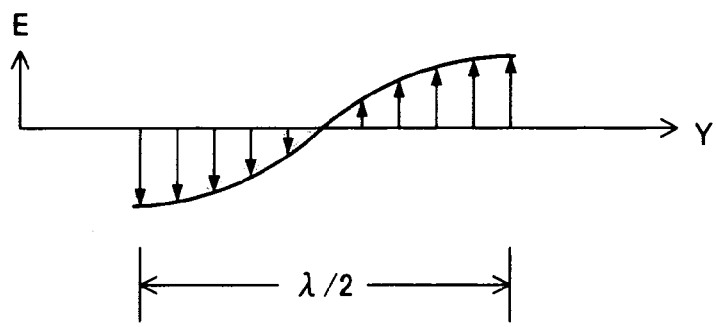
FIG. 29 is a drawing explaining the electric field in the Y-axis direction of the patch antenna.

In the fifth embodiment, when the length of one edge of the patch antenna 62 of the RFID tag (FIG. 22) is made to be $\lambda/2$ and the antenna is caused to resonate at a predetermined frequency, the electric field E in the Y-axis direction changes as shown in FIG. 29, and the electric field becomes zero in the center section. This means that it is possible to emit radio waves in a direction perpendicular to the patch antenna as in the case of the fifth embodiment without the electric field distribution changing if the patch antenna and ground are short circuited in the center.

The RFID tag of the six embodiment shown in FIG. 28 is short circuited between one edge of the patch antenna 62 and ground 65 on the side surface of the substrate 61 by a short-circuit unit 66 based on related principles, and by doing so, the size of the patch antenna 62 is made about ½ the size of that of the RFID tag of the fifth embodiment. In other words, the length in the Y-axis direction is made to be $\lambda/4$.

Other than the point that a short circuit is formed between one side of the patch antenna and ground, and the point that the size of the RFID tag is different, the RFID tag of this sixth embodiment has nearly the same construction as the RFID tag of the fifth embodiment. The patch antenna 62 that functions as the tag antenna, and the loop pattern 63 that functions as the power-supply pattern are both formed on the top surface of a double-sided printed circuit board 61 by etching, and a conductive pattern 65 ((B) of FIG. 28) on the bottom surface of the printed circuit board 61 is used as ground, and a short circuit is formed on the side surface of the board between one edge of the patch antenna and ground by a short-circuit unit 66. This short-circuit unit 66 can be formed by a plating process.

A cut-out section 62a is formed on the end section of the patch antenna 62, and a loop pattern 63 having a predetermined line width is placed in the cut-out section. The loop pattern 63 and patch antenna 62 are high-frequency connected by way of the cut-out section, and power is in the high frequency supplied to the patch antenna 62 from the loop pattern 63. The LSI chip 64 of the RFID tag is mounted on the end section of the loop pattern 63 using a chip bonding technique. The length s2 of the loop pattern 63 is adjusted so that the impedance of the tag antenna is matched with the LSI chip 64. Also, the resonant frequency can be adjusted by adjusting the depth s5 of a cut-out section 67.

Various adjustments are possible using the same methods as those of the first through fifth embodiments. For example, by changing the depth s5 of the cut-out section 67 formed in the top surface of the patch antenna 62, it is possible to adjust the resonant frequency of the patch. Also, by changing the length s2 of the power-supply pattern 63, it is possible to adjust the input impedance of the tag antenna. As a concrete example are the results of simulating the frequency characteristic of the impedance and the frequency characteristic of the communication distance shown in FIG. 30 and FIG. 31, respectively.

Figure 30:
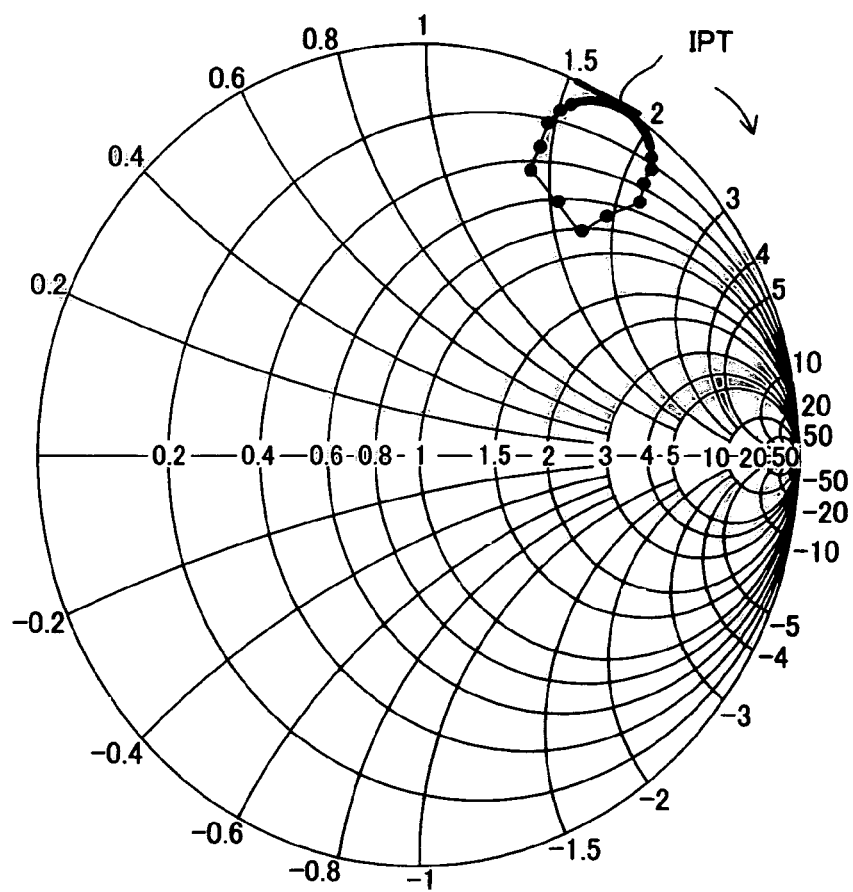
FIG. 30 is a drawing showing the impedance/frequency characteristic plotted on a Smith chart for the impedance of the sixth embodiment.

FIG. 30 shows the impedance locus on a Smith chart when an RFID tag having a 30 mm×30 mm×2.5 mm dielectric member of which specific dielectric constant is 8.0 and dielectric loss is 0.002, is placed on an infinite conductive plate. Depending on the dimension s2 of the loop pattern 63, it may not be possible to match the impedance, however, in that case the dimension s2 is adjusted. As the dimension s2 becomes small, the impedance locus IPT obtained by changing the frequency on the Smith turns in the counterclockwise in the direction of the arrow, so at a desirable frequency, the dimension s2 is adjusted in order to match the impedance.

Figure 31:
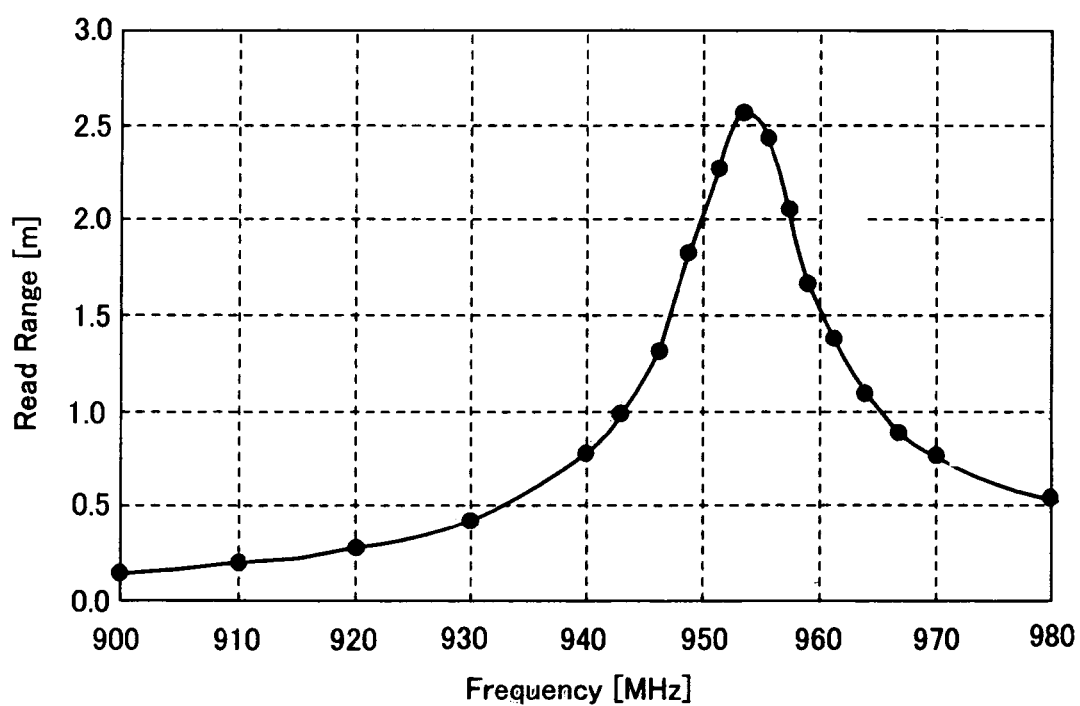
FIG. 31 is a drawing showing the frequency characteristic of the communication distance.

FIG. 31 shows the communication distance when the frequency is changed from 900 MHz to 980 MHz. When calculating the communication distance, the characteristic of the tag LSI and reader/writer (RW) antenna are taken to be as follows. In other words, the impedance of the tag LSI at 953 MHz is taken to be 32−j 109[Ω], the power supplied to RW antenna is taken to be 0.5 [W], and the gain of the RW antenna is taken to be 9[dBi]. As can be clearly seen from the simulation results of this communication distance, a distance (approximately 2.6 m) in a frequency band (952-954 MHz) that is practical and sufficient for UHF band RFID tag can be obtained.

In addition to the advantages of the first to fifth embodiments, this sixth embodiment has the advantage of being able to reduce the size of the RFID tag by half.

This sixth embodiment is an embodiment in which the principle of halving the size of the tag by forming a short circuit between the patch antenna and ground is applied to the RFID tag of the fifth embodiment, however, the size of the tag can also be halved by applying that principle to the RFID tag of the first to fourth embodiment as well.

(G) Variation

The tag antennas of embodiments 1 to 6 described above, are tag antennas that emit an electric wave that is linearly polarized in the Y-axis direction as shown in FIG. 2 in the vertical direction from a horizontal plane (patch antenna surface), and naturally, are capable of receiving an incident electric wave that is linearly polarized in the Y-axis direction and comes from the vertical direction onto the patch antenna surface. However, these tag antennas are not capable of receiving an electric wave that is linearly polarized in the X-axis direction. Therefore, the tag antenna is made to be capable of emitting a circularly polarized electromagnetic wave and receiving an incident electric wave that is linearly polarized in any direction.

FIG. 32 shows an example of the construction of a patch antenna that is capable of emitting and receiving a circularly polarized electromagnetic wave. An example of cutting part 71, 72 of the patch antenna PATT in a direction that is diagonal to the direction that the current J flows back and forth is shown in (A) of FIG. 32, and an example forming a slot 73 in the patch antenna PATT in a direction that is diagonal to the direction that the current J flows back and forth is shown in (B) of FIG. 32.

(H) Manufacturing Method for an RFID Tag (a) First Manufacturing Method

Figure 33:
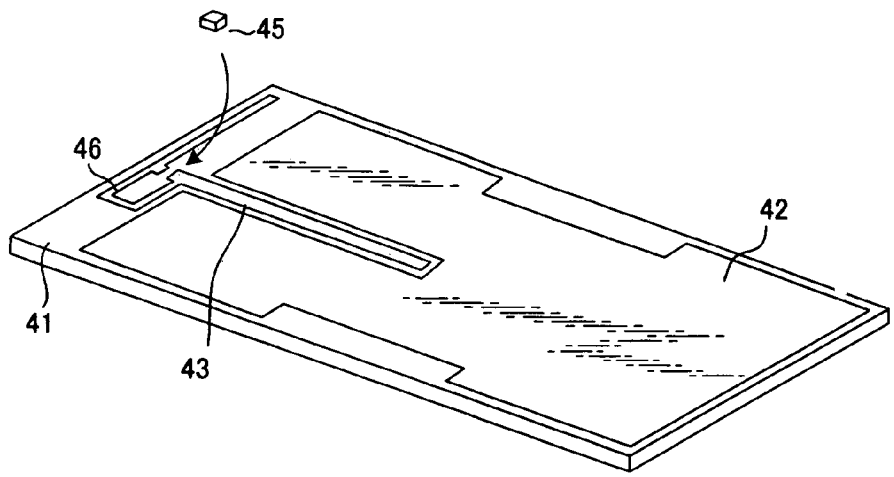
FIG. 33 is a drawing explaining a first manufacturing method for an RFID tag.

FIG. 33 is a drawing that explains a first method for manufacturing an RFID tag, and shows an example of applying the method to manufacturing the RFID tag of the second embodiment; however, the method can also be applied to manufacturing the RFID tags of the third to fifth embodiments.

A double-sided print board 41 on which an electrically conductive pattern is coated on both sides is prepared, and a patch antenna 42 that functions as the tag antenna, a small dipole antenna 43 on which an LSI chip is to be mounted, and a parallel inductor 46 are formed by etching the surface of that double-sided print board 41. Next, an LSI chip 45 is mounted on the small dipole antenna 43 by chip bonding, to create the RFID tag. The conductive pattern on the rear surface of the double-sided print board 41 is used as the ground GND of the tag antenna.

(b) Second Manufacturing Method

Figure 34:
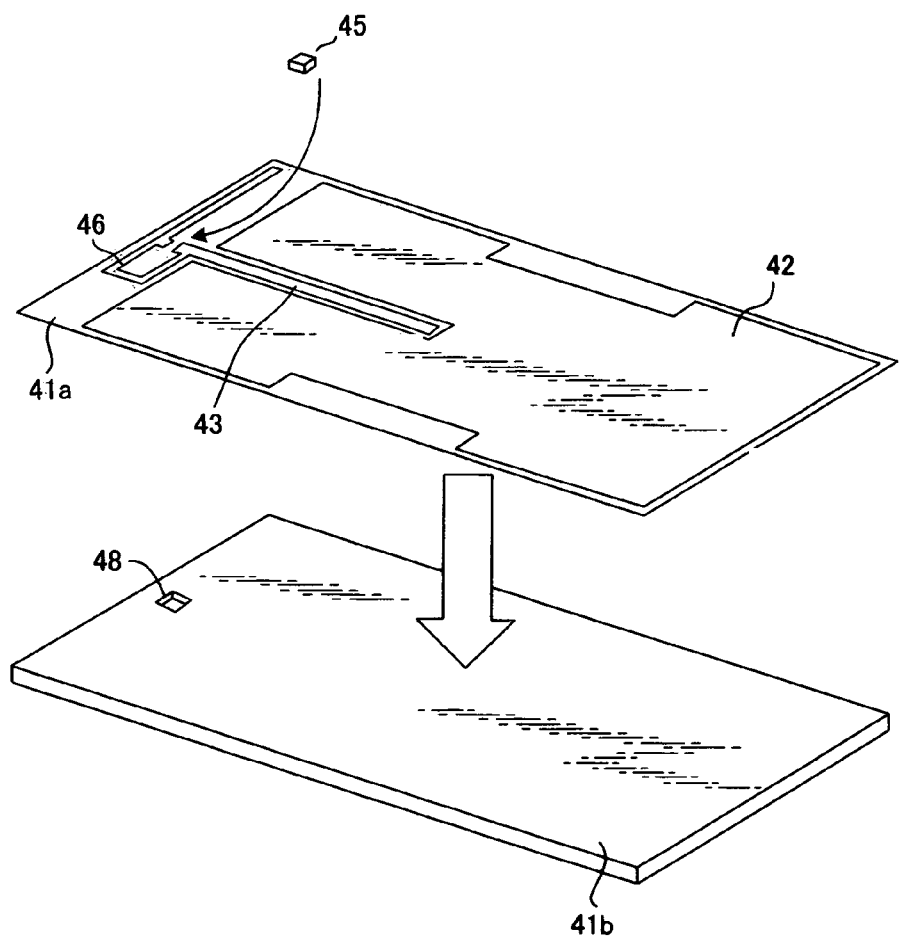
FIG. 34 is a drawing explaining a second manufacturing method for an RFID tag.

FIG. 34 is a drawing that explains a second method for manufacturing an RFID tag, and shows an example of applying the method to manufacturing the RFID tag of the second embodiment; however, the method can also be applied to manufacturing the RFID tags of the third to fifth embodiments.

A patch antenna 42 that functions as the tag antenna, a small dipole antenna 43 on which an LSI chip is to be mounted, and a parallel inductor 46 are formed by printing or etching an insulating film 41a such as PET, and an LSI chip 45 is mounted on the small dipole antenna 43 by chip bonding.

Next, a single-sided print board 41b on which an electrically conductive pattern is coated on one side is prepared, and the insulating film 41a is attached to the surface of the single-sided print board 41b on which the conductive pattern is not formed using adhesive, double-sided tape or the like, to create the RFID tag.

The conductive pattern on the rear surface of the single-sided print board 41b is used as the ground GND of the tag antenna. Also, by forming a depression 48 on the single-sided print board 41b, and placing the LSI chip in that depression 48, the insulating film 41a will not be uneven.

(c) Third Manufacturing Method

Figure 35:
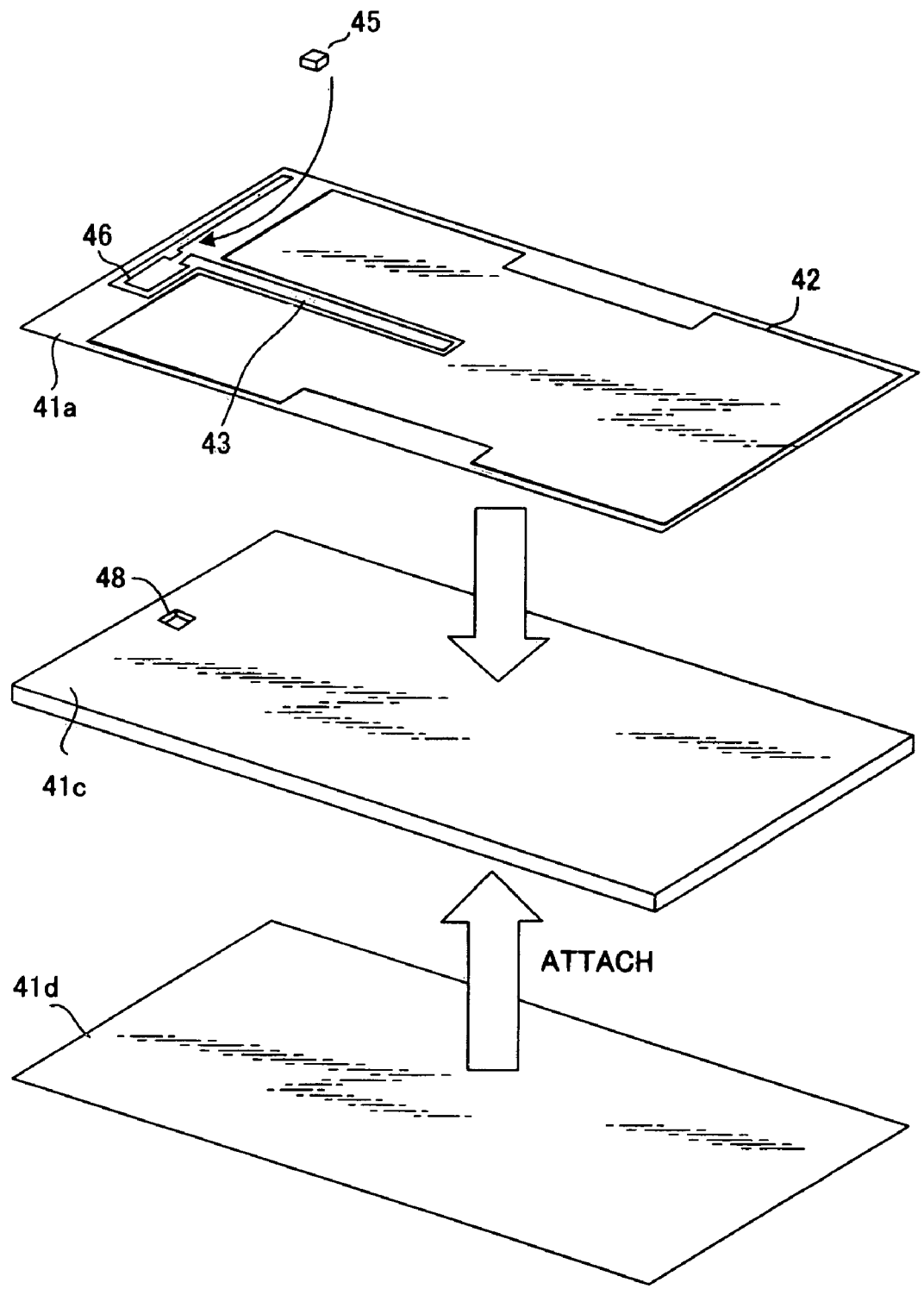
FIG. 35 is a drawing explaining a third manufacturing method for an RFID tag.

FIG. 35 is a drawing that explains a third method for manufacturing an RFID tag, and shows an example of applying the method to manufacturing the RFID tag of the second embodiment; however, the method can be applied to manufacturing the RFID tags of the third to fifth embodiments.

A patch antenna 42 that functions as the tag antenna, a small dipole antenna 43 on which an LSI chip is to be mounted, and a parallel inductor 46 are formed by printing or etching an insulating film 41a such as PET, and an LSI chip 45 is mounted on the small dipole antenna 43 by chip bonding.

Next, a dielectric body 41c such as PET, and an electrically conductive sheet 41d such as copper or aluminum are prepared, and the insulating film 41a is attached to one surface of the dielectric body 41c using adhesive, double-sided tape or the like, and the conductive sheet 41d is attached to the other side of the dielectric body 41c to create the RFID tag.

By forming a depression 48 on the dielectric body 41c, and placing the LSI chip in that depression 48, the insulating film 41a will not be uneven.

(d) Fourth Manufacturing Method

Figure 36:
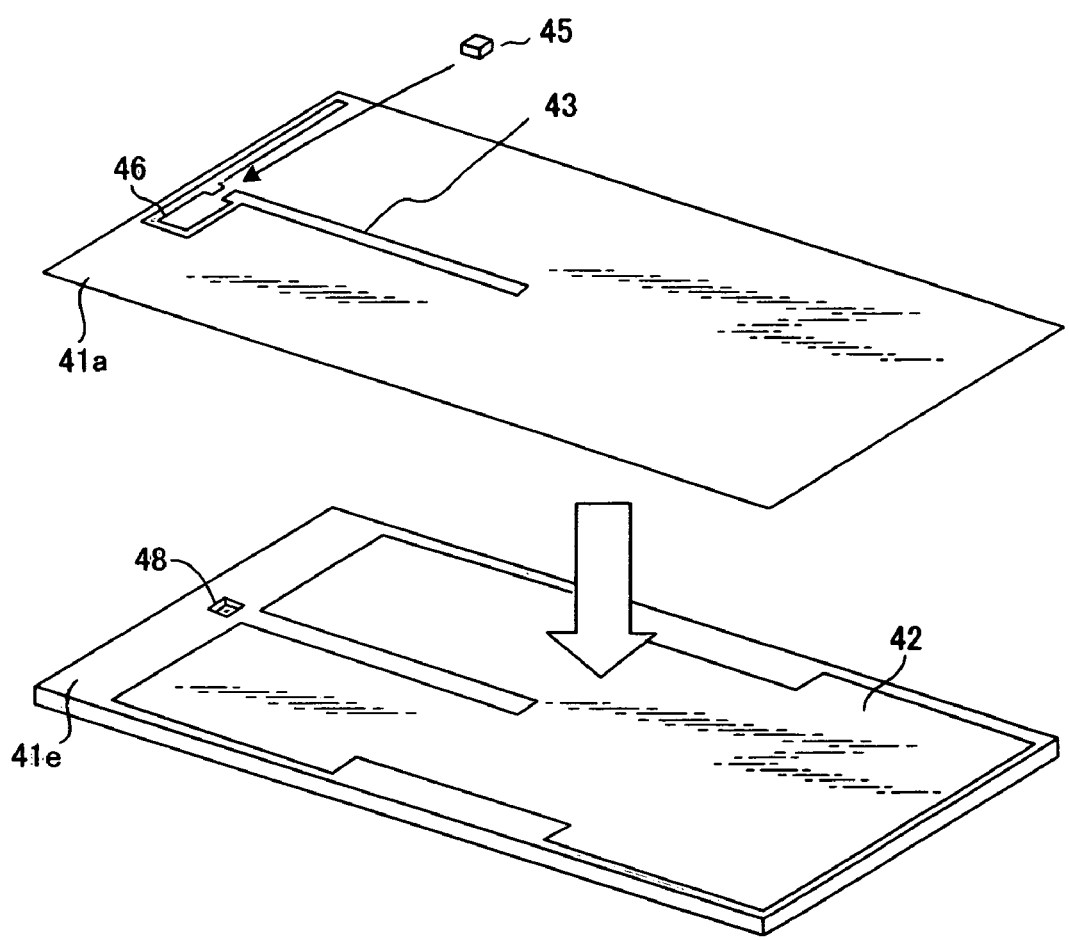
FIG. 36 is a drawing explaining a fourth manufacturing method for an RFID tag.

FIG. 36 is a drawing that explains a fourth method for manufacturing an RFID tag, and shows an example of applying the method to manufacturing the RFID tag of the second embodiment; however, the method can also be applied to manufacturing the RFID tags of the first and third to fifth embodiments.

A small dipole antenna 43 on which an LSI chip is to be mounted, and a parallel inductor 46 are formed by printing or etching an insulating film 41a such as PET, and an LSI chip 45 is mounted on the small dipole antenna 43 by chip bonding.

Also, a double-sided print board 41e that is coated with an electrically conductive pattern on both sides is prepared, and a patch antenna 42 that functions as the tag antenna is formed on the surface of the double-sided print board 41e by etching, and the conductive pattern on the rear side of the double-sided print board 41e is used as the ground GND of the tag antenna.

Next, the insulating film 41a is attached to the surface of the double-sided print board 41e on which the patch antenna 42 is formed using adhesive, double-sided tape or the like, to create the RFID tag.

By forming a depression 48 on the double-sided print board 41e, and placing the LSI chip in that depression 48, the insulating film 41a will not be uneven.

With this fourth manufacturing method, it is possible to use in common an insulating film 41a in all countries, even if the frequency band that is used differs according to country. That is, it is sufficient for each country to prepare a patch antenna which resonates by a frequency used in the country.

(e) Fifth Manufacturing Method

Figure 37:
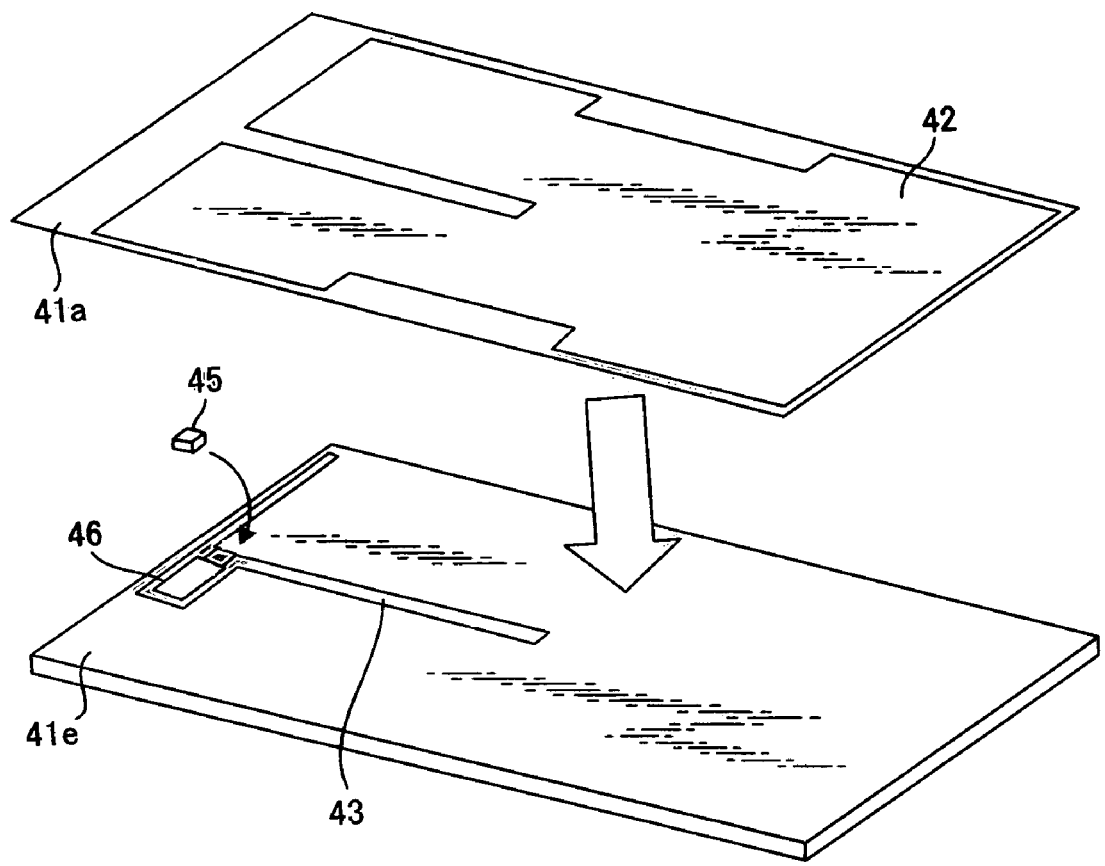
FIG. 37 is a drawing explaining a fifth manufacturing method for an RFID tag.
Figure 38:
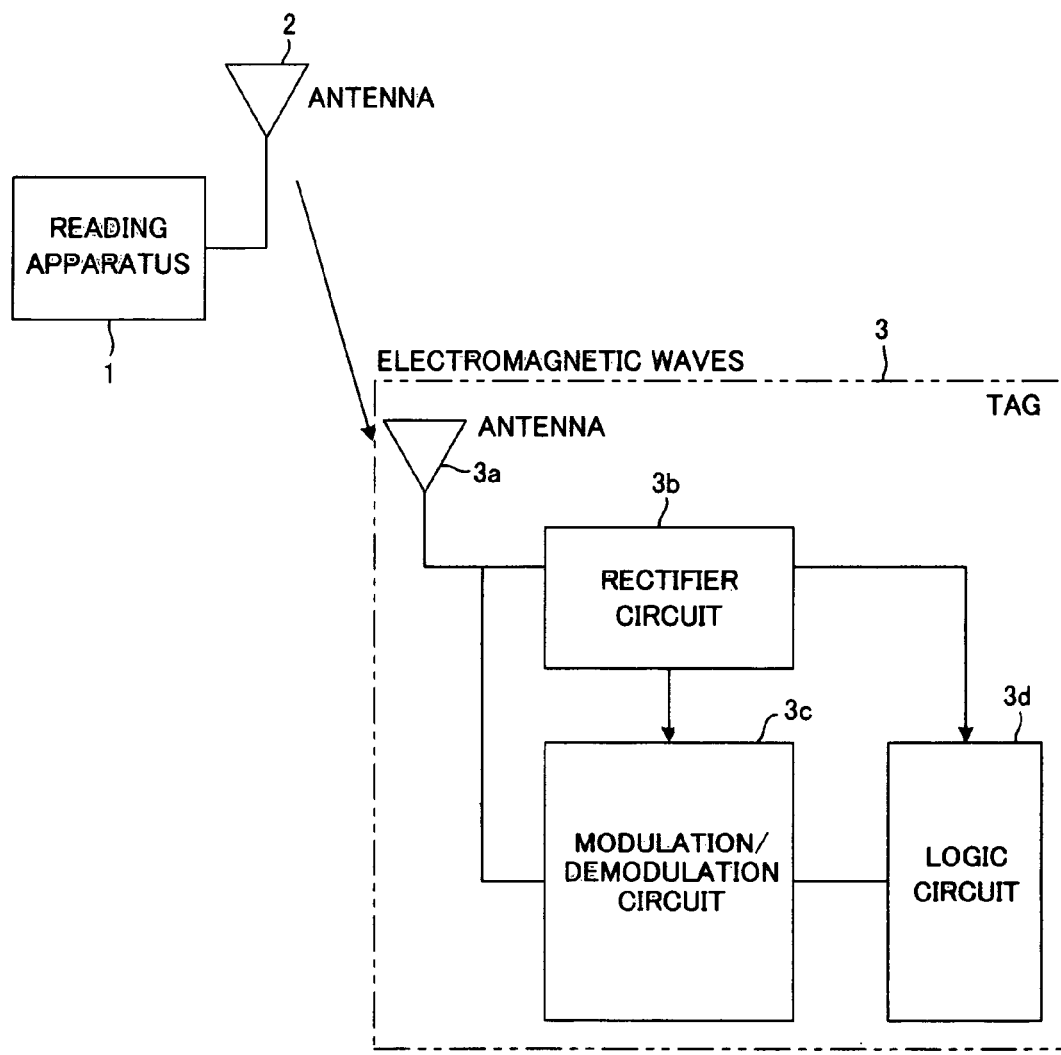
FIG. 38 is a drawing explaining an RFID tag.
Figure 39:
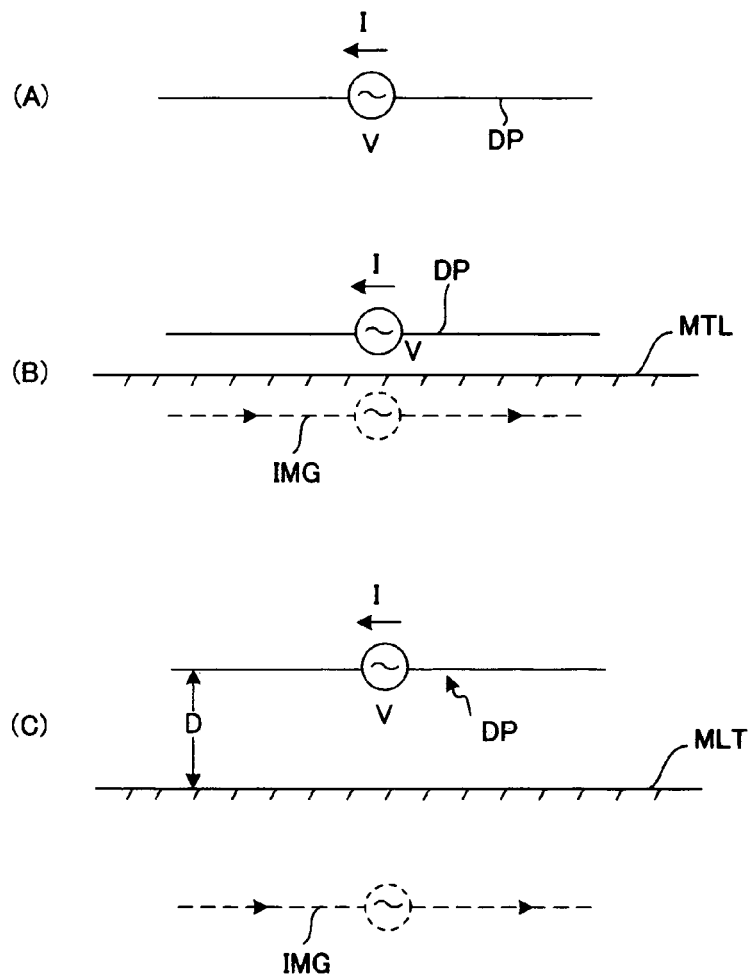
FIG. 39 is a drawing explaining the occurrence of problems in a prior RFID tag.
Figure 40:
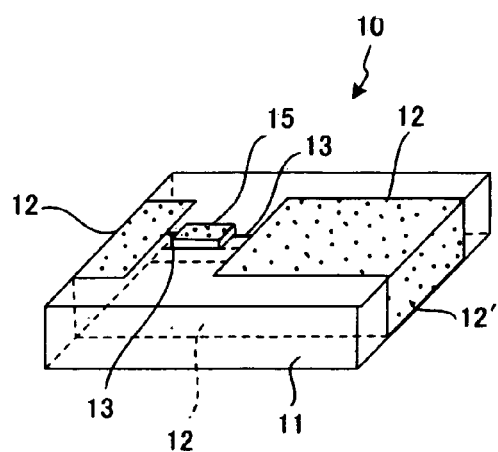
FIG. 40 is a perspective view of a prior RFID tag.

FIG. 37 is a drawing that explains a fifth method for manufacturing an RFID tag, and shows an example of applying the method to manufacturing the RFID tag of the second embodiment; however, the method can also be applied to manufacturing the RFID tags of the first and, third to fifth embodiments.

A patch antenna 42 that functions as a tag antenna is formed on an insulating film 41a such as PET by printing or etching.

Also, a double-sided print board that is coated with an electrically conductive pattern on both sides is prepared, and a small dipole antenna 43 on which an LSI chip will be mounted and a parallel inductor 46 are formed on the surface of the double-sided print board 41e by etching, and then an LSI chip 45 is mounted on the small dipole antenna 43 by chip bonding.

The conductive pattern on the rear side of the double-sided print board 41e is used as the ground GND of the tag antenna.

Next, the insulating film 41a is attached to the surface of the double-sided print board 41e on which the small dipole antenna 43 is formed using adhesive, double-sided tape or the like, to create the RFID tag.

With this fifth manufacturing method, it is possible to use in common a double-sided print board 41e in all countries, even if the frequency band that is used differs according to country. That is, it is sufficient for each country to prepare an insulating film 41e on which a patch antenna is formed.

As many apparently widely different embodiments of the present invention can be made without departing from the spirit and scope thereof, it is to be understood that the invention is not limited to the specific embodiments thereof except as defined in the appended claims.

What is claimed is:

1. A tag having a patch antenna that functions as the tag antenna, comprising:
   a small dipole antenna having two straight sections connected at a bent section, one end of the straight sections being located inside a cutout section of the patch antenna, the cutout section being straight and extending from the center of an edge toward the inside of the patch antenna;
   a loop pattern connected to the small dipole antenna and functioning as a parallel inductor; and
   an LSI chip mounted to the small dipole antenna near the bent section; wherein
   in operation, a high-frequency connection between the small dipole antenna and the patch antenna is realized by way of the cutout section, by which high-frequency connection power is electromagnetically supplied from the small dipole antenna to the patch antenna.

2. The RFID tag of claim 1 further comprising:
   a dielectric member having said small dipole antenna, said loop pattern, said LSI chip and said patch antenna formed on one side, and a conductive pattern that functions as a ground formed on the other side.

* * * * *